(12) United States Patent
Long

(10) Patent No.: US 12,641,086 B2
(45) Date of Patent: May 26, 2026

(54) METHOD AND APPARATUS FOR REGISTRATION DATA RETRIEVAL

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 457 days.

(21) Appl. No.: 17/760,186

(22) PCT Filed: Feb. 7, 2021

(86) PCT No.: PCT/CN2021/075750
§ 371 (c)(1),
(2) Date: Aug. 5, 2022

(87) PCT Pub. No.: WO2021/155860
PCT Pub. Date: Aug. 12, 2021

(65) Prior Publication Data
US 2023/0075951 A1    Mar. 9, 2023

(30) Foreign Application Priority Data

Feb. 7, 2020    (WO) ................ PCT/CN2020/074527

(51) Int. Cl.
*H04L 9/40*        (2022.01)
(52) U.S. Cl.
CPC ........ *H04L 63/102* (2013.01); *H04L 63/0407* (2013.01)

(58) Field of Classification Search
USPC ........................................................... 726/3
See application file for complete search history.

(56) References Cited

U.S. PATENT DOCUMENTS

2020/0228420 A1* 7/2020 Dao ........................ H04L 43/08
2022/0014599 A1* 1/2022 Zhang ..................... H04L 67/51
(Continued)

FOREIGN PATENT DOCUMENTS

| CN | 110291837 A | 9/2019 |
| CN | 110365796 A | 10/2019 |
| CN | 110574449 A | 12/2019 |

(Continued)

OTHER PUBLICATIONS

3GPP TS 29.503 V16.2.0, 3rd Generation Partnership Project; Technical Specification Group Core Network and Terminals; 5G System Unified Data Management Services (Year: 2019).*
(Continued)

*Primary Examiner* — Sanchit K Sarker
(74) *Attorney, Agent, or Firm* — Nicholson De Vos Webster & Elliott LLP

(57) ABSTRACT

A method and apparatus for registration data retrieval. The method performed by a network function service consumer entity comprises sending a request for retrieving at least two registration data set related to a user equipment to a data management entity. The request includes two or more corresponding registration data set names. The method further comprises receiving a response from the data management entity. The response comprises at least two requested registration data sets related to the user equipment.

5 Claims, 14 Drawing Sheets

(56)                    References Cited

U.S. PATENT DOCUMENTS

| | | | | |
|---|---|---|---|---|
| 2022/0046101 A1* | 2/2022 | Zhang | .................... | H04L 67/51 |
| 2022/0369145 A1* | 11/2022 | Park | .................... | H04W 24/10 |

FOREIGN PATENT DOCUMENTS

| | | |
|---|---|---|
| WO | 2019101340 A1 | 5/2019 |
| WO | 2019/192593 A1 | 10/2019 |

OTHER PUBLICATIONS

International Search Report and Written Opinion for Application No. PCT/CN2021/075750, May 6, 2021, 13 pages.

3GPP TS 23.040 V15.3.0, "3rd Generation Partnership Project; Technical Specification Group Core Network and Terminals; Technical realization of the Short Message Service (SMS) (Release 15)," Mar. 2019, 216 pages, 3GPP Organizational Partners.

3GPP TS 23.228 V16.2.0, "3rd Generation Partnership Project; Technical Specification Group Services and System Aspects; IP Multimedia Subsystem (IMS); Stage 2 (Release 16)," Sep. 2019, 348 pages, 3GPP Organizational Partners.

3GPP TS 23.288 V16.2.0, "3rd Generation Partnership Project; Technical Specification Group Services and System Aspects; Architecture enhancements for 5G System (5GS) to support network data analytics services (Release 16)," Dec. 2019, 57 pages, 3GPP Organizational Partners.

3GPP TS 23.501 V16.3.0, "3rd Generation Partnership Project; Technical Specification Group Services and System Aspects; System architecture for the 5G System (5GS); Stage 2 (Release 16)," Dec. 2019, 417 pages, 3GPP Organizational Partners.

3GPP TS 23.502 V16.3.0, "3rd Generation Partnership Project; Technical Specification Group Services and System Aspects; Procedures for the 5G System (5GS); Stage 2 (Release 16)," Dec. 2019, 558 pages, 3GPP Organizational Partners.

3GPP TS 23.632 V16.0.0, "3rd Generation Partnership Project; Technical Specification Group Core Network and Terminals; User data interworking, coexistence and migration; Stage 2; (Release 16)," Dec. 2019, 33 pages, 3GPP Organizational Partners.

3GPP TS 29.500 V16.2.1, "3rd Generation Partnership Project; Technical Specification Group Core Network and Terminals; 5G System; Technical Realization of Service Based Architecture; Stage 3 (Release 16)," Jan. 2020, 50 pages, 3GPP Organizational Partners.

3GPP TS 29.503 V16.2.0, "3rd Generation Partnership Project; Technical Specification Group Core Network and Terminals; 5G System; Unified Data Management Services; Stage 3 (Release 16)," Dec. 2019, 280 pages, BGPP Organizational Partners.

3GPP TS 29.503 V16.3.0, "3rd Generation Partnership Project; Technical Specification Group Core Network and Terminals; 5G System; Unified Data Management Services; Stage 3 (Release 16)," Mar. 2020, 319 pages, 3GPP Organizational Partners.

3GPP TS 29.505 V16.1.0, "3rd Generation Partnership Project; Technical Specification Group Core Network and Terminals; 5G System; Usage of the Unified Data Repository services for Subscription Data; Stage 3 (Release 16)," Dec. 2019, 136 pages, 3GPP Organizational Partners.

3GPP TS 29.571 V16.2.0, "3rd Generation Partnership Project; Technical Specification Group Core Network and Terminals; 5G System; Common Data Types for Service Based Interfaces; Stage 3 (Release 16)," Dec. 2019, 96 pages, 3GPP Organizational Partners.

Communication pursuant to Article 94(3) EPC, EP App. No. 21708550. 5, May 16, 2023, 6 pages.

International Preliminary Report on Patentability, PCT App. No. PCT/CN2021/075750, May 9, 2022, 6 pages.

Written Opinion of the International Preliminary Examining Authority, PCT App. No. PCT/CN2021/075750, Jan. 14, 2022, 6 pages.

Decision to grant, EP App. No. 21708550.5, Mar. 13, 2025, 2 pages.

Huawei et al., "Pseudo CR on TS 23.502 for updating registration procedures with NF service operation invocations," Jun. 26-30, 2017, 16 pages, SA WG2 Meeting #122, S2-174161, San Jose Del Cabo, Mexico.

Communication under Rule 71(3) EPC, EP App. No. 21708550.5, Sep. 27, 2024, 6 pages.

Office Action, CN App. No. 2021800129773, Apr. 27, 2025, 11 pages (3 pages English Translation, 8 pages Original Document).

Notice of Allowance, CN App. No. 202180012977.3, Sep. 29, 2025, 8 pages (04 pages of English Translation and 04 pages of Original Document).

* cited by examiner

Figure 5:
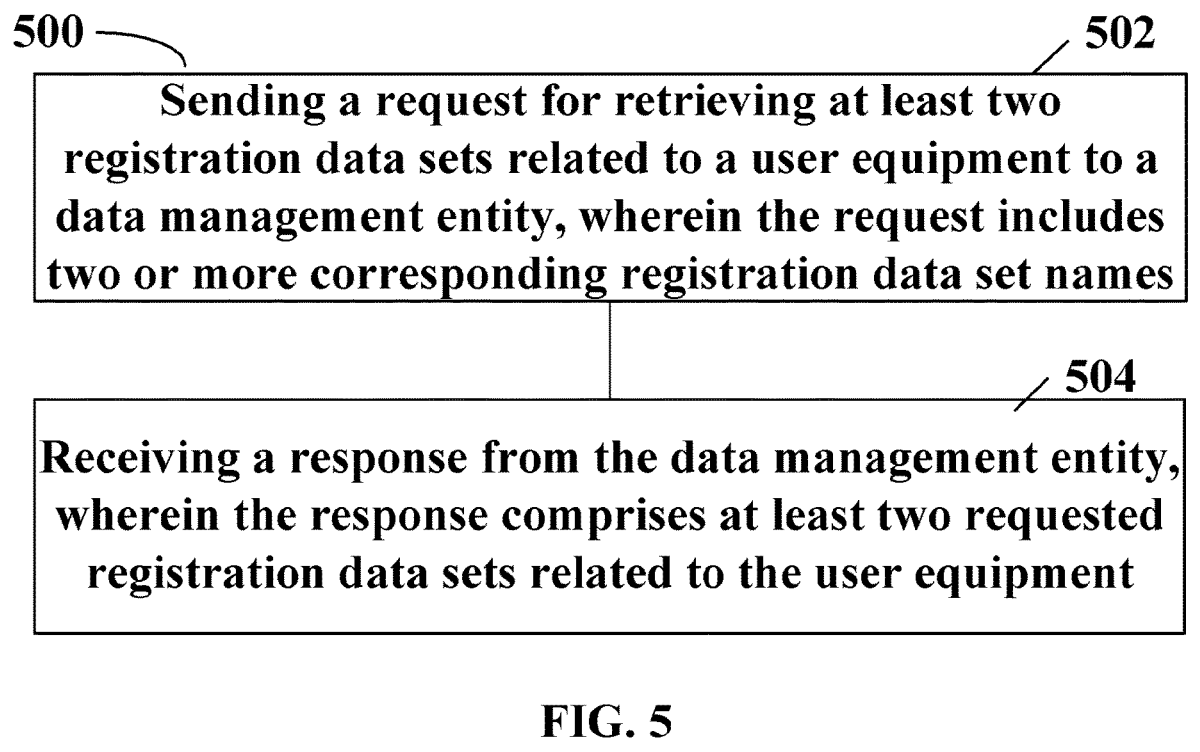

500 ⌐⟍                                                502

Sending a request for retrieving at least two
registration data sets related to a user equipment to a
data management entity, wherein the request includes
two or more corresponding registration data set names

504

Receiving a response from the data management entity,
wherein the response comprises at least two requested
registration data sets related to the user equipment

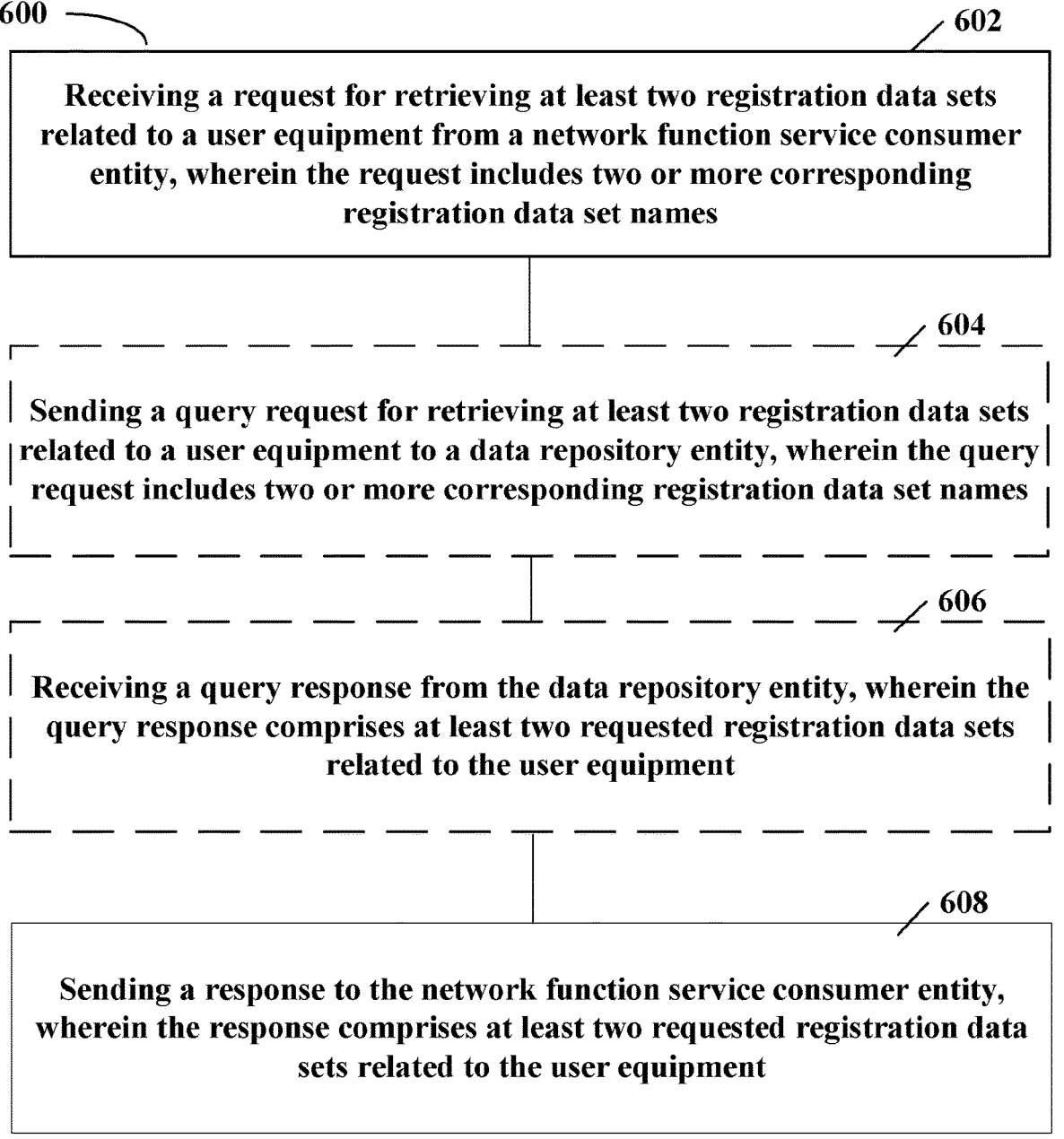

Receiving a request for retrieving at least two registration data sets related to a user equipment from a network function service consumer entity, wherein the request includes two or more corresponding registration data set names

604

Sending a query request for retrieving at least two registration data sets related to a user equipment to a data repository entity, wherein the query request includes two or more corresponding registration data set names

606

Receiving a query response from the data repository entity, wherein the query response comprises at least two requested registration data sets related to the user equipment

608

Sending a response to the network function service consumer entity, wherein the response comprises at least two requested registration data sets related to the user equipment

Receiving a query quest for retrieving at least two registration data sets related to a user equipment from a data management entity, wherein the query request includes two or more corresponding registration data set names

704

Sending a query response to the data management entity, wherein the query response comprises at least two requested registration data sets related to the user equipment

FIG. 7

NF Service Consumer

UDM

802. GET ...{ueId}/registrations?registration-dataset-names=AMF_3GPP,AMF_NON_3GPP 804.200 OK(RegistrationDataSets)

Receiving module 1402

Sending module 1404

Receiving module 1502

Sending module 1504

FIG. 15

METHOD AND APPARATUS FOR REGISTRATION DATA RETRIEVAL

CROSS-REFERENCE TO RELATED APPLICATIONS

This application is a National stage of International Application No. PCT/CN2021/075750, filed Feb. 7, 2021, which claims priority to International Application No. PCT/CN2020/074527, filed Feb. 7, 2020, which are hereby incorporated by reference.

TECHNICAL FIELD

The non-limiting and exemplary embodiments of the present disclosure generally relate to the technical field of communications, and specifically to methods and apparatuses for registration data retrieval.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network, registration data related to a specific UE (user equipment) may be retrieved by various network function entities such as network data analytics function (NWDAF), home subscriber server (HSS), etc.

For example, data collection from network functions (NFs) may be used by NWDAF to subscribe/unsubscribe at any NF to be notified for data on a set of events. The data collection from NFs may be based on the services of the NFs such as AMF (Access and mobility management Function), SMF (Session Management Function), UDM (Unified Data Management), PCF (Policy Control Function), NRF (NF Repository Function) and AF (Application Function) (possibly via NEF (Network Exposure Function)). This data collection service may be used directly in order to retrieve behaviour data for individual UEs or groups of UEs (e.g. UE reachability), and also to retrieve global UE information (e.g. Number of UEs present in a geographical area). Table 1 shows services consumed by NWDAF for data collection. The disclosure of 3rd Generation Partnership Project (3GPP) TS 23.288 V16.2.0 is incorporated by reference herein in its entirety.

TABLE 1

Services consumed by NWDAF for data collection

| Service producer | Service | Reference in 3GPP TS 23.502 V16.3.0 |
|---|---|---|
| AMF | Namf_EventExposure | 5.2.2.3 |
| SMF | Nsmf_EventExposure | 5.2.8.3 |
| PCF | Npcf_EventExposure (for a group of UEs or any UE) Npcf_PolicyAuthorization_Subscribe (for a specific UE) | 5.2.5.7 |
| UDM | Nudm_EventExposure | 5.2.3.5 |
| NEF | Nnef_EventExposure | 5.2.6.2 |
| AF | Naf_EventExposure | 5.2.19.2 |
| NRF | Nnrf_NFDiscovery Nnrf_NFManagement | 5.2.7.3 5.2.7.2 |

To retrieve data related to a specific UE, the NWDAF shall first determine which NF instances are serving this UE as stated in Table 2 unless the NWDAF has already obtained this information due to recent operations related to this UE.

TABLE 2

NF Services consumed by NWDAF to determine which NF instances are serving a UE

| Type of NF instance (serving the UE) to determine | NF to be contacted by NWDAF | Service | Reference in 3GPP TS 23.502 V16.3.0 |
|---|---|---|---|
| UDM | NRF | Nnrf_NFDiscovery | 5.2.7.3 |
| AMF | UDM | Nudm_UECM | 5.2.3.2 |
| SMF | UDM | Nudm_UECM | 5.2.3.2 |
| BSF | NRF | Nnrf_NFDiscovery | 5.2.7.3 |
| PCF | BSF | Nbsf_Management | 5.2.13.2 |
| NEF | NRF | Nnrf_NFDiscovery | 5.2.7.3 |

The AMF, SMF instances may be determined using a request to UDM providing the SUPI (subscription permanent identifier) or the group identity. To determine the SMF serving a PDU (protocol data unit) session, the NWDAF may in addition provide the DNN (data network name) and S-NSSAI (single network slice selection assistance information) of this PDU Session; otherwise the NWDAF will obtain a list of possibly multiple SMFs (e.g. one per PDU session).

FIG. 1a shows an interaction when SMS-GMSC (Short Message Service-Gateway Mobile Switch Center) retrieves routing information from the HSS for MT-SMS (mobile terminated-short message service) delivery.

At step 1, the HSS receives a request for routing information from the SMS-GMSC via MAP (Mobile Application Part) or S6c.

At step 2, the HSS queries the EPS-UDR via Ud to read the registered MME (Mobile Management Entity)/MSC (Mobile Switching Centre), the registered SGSN(Serving GPRS (General Packet Radio Service) Support Node), the UE-not-reachable flags for MME/MSC, SGSN, 3GppSMSF (3GPP Short Message Service Function) and Non3GppSMSF and the SMSF Registration Notification flag.

At step 3, if the UE-not-reachable flags for 3GppSMSF, Non3GppSMSF and SMSF Registration Notification flag are not set and unless the user is known not to be registered in 5GC (fifth generation core network), the HSS retrieves the registered SMSF addresses (if any) from the UDM.

At steps 4-5, the UDM retrieves the requested information from the 5GS-UDR (fifth generation system-unified date repository).

At step 6, the UDM forwards the retrieved addresses to the HSS if any.

At step 7, the HSS returns the relevant MT-SMS target node addresses registered in HSS and/or UDM to the SMS-GMSC and the procedure is terminated.

Otherwise, if there is no MT-SMS target node address registered in HSS nor in UDM, a negative response (Absent Subscriber SM) is sent to the SMS-GMSC and the procedure continues with steps 8 to 11.

At step 8, the HSS includes the SMSC address to the Message Waiting Data (MWD) stored in the EPS-UDR (evolved packet system-UDR) and informs the SMSC as defined in 3GPP TS 23.040 V15.3.0, the disclosure of which is incorporated by reference herein in its entirety. The relevant UE-not-reachable flags and the SMSF Registration Notification flag are set in the EPS-UDR.

At step 9, the HSS subscribes in UDM to be notified when the UE registers in the 5GC for SMS service (i.e. when an SMSF is registered in UDM) by using the Nudm_EE_Subscribe service operation (SUPI, SMSF Registration Notification event) as defined in 3GPP TS 23.502 V16.3.0.

In this case, the HSS subscribes to SMSF Registration Notification event in UDM instead to the UE Reachability Notification as even if the UE is reachable in an AMF, the UE will not be ready for SMS within the 5GC until an SMSF is registered for the UE in UDM.

At step 10, the UDM stores the SMSF Registration Notification flag in the 5GS-UDR.

At step 11, the UDM acknowledges the subscription to the HSS.

The messages as shown in FIG. 1 are same as the corresponding messages as described in 3GPP TS 23.632 V16.0.0, the disclosure of which is incorporated by reference herein in its entirety.

FIG. 2 shows UDM UECM (UE Context Management) Resources, which is a copy of FIG. 6.2.3.1-1 of 3GPP 29.503 V16.2.0, the disclosure of which is incorporated by reference herein in its entirety.

Table 3 provides an overview of the resources and applicable HTTP (hyper text transfer protocol) methods, which is a copy of Table 6.2.3.1-1 of 3GPP 29.503 V16.2.0.

TABLE 3

| Resources and methods overview | | | |
|---|---|---|---|
| Resource name (Archetype) | Resource URI | HTTP method or custom operation | Description |
| Amf3GppAccessRegistration (Document) | /{ueId}/registrations/amf-3gpp-access | PUT | Update the AMF registration for 3GPP access |
| | | PATCH | Modify the AMF registration for 3GPP access |
| | | GET | Retrieve the AMF registration information for 3GPP access |
| AmfNon3GppAccessRegistration (Document) | /{ueId}/registrations/amf-non-3gpp-access | PUT | Update the AMF registration for non 3GPP access |
| | | PATCH | Modify the AMF registration for non 3GPP access |
| | | GET | Retrieve the AMF registration information for non 3GPP access |
| SmfRegistrations (Store) | /{ueId}/registrations/smf-registrations | GET | Retrieve the SMF registration information |
| IndividualSmfRegistration (Document) | /{ueId}/registrations/smf-registrations/{pduSessionId} | PUT | Create an SMF registration identified by PDU Session Id |
| | | DELETE | Delete an individual SMF registration |
| | | PATCH | Modify an individual SMF Registration |
| Smsf3GppAccessRegistration (Document) | /{ueId}/registrations/smsf-3gpp-access | PUT | Create or Update the SMSF registration |
| | | DELETE | Delete the SMSF registration for 3GPP access |
| | | PATCH | Modify the SMSF registration |
| | | GET | Retrieve the SMSF registration information |
| SmsfNon3GppAccessRegistration (Document) | /{ueId}/registrations/smsf-non-3gpp-access | PUT | Create or Update the SMSF registration for non 3GPP access |
| | | DELETE | Delete the SMSF registration for non 3GPP access |
| | | PATCH | Modify the SMSF registration for non 3GPP access |
| | | GET | Retrieve the SMSF registration information for non 3GPP access |

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As described above, to retrieve data related to a specific UE, the NWDAF shall first determine which NF instances are serving this UE as in Table 2:

For AMF instance serving the UE, NWDAF may contact UDM through the Nudm_UECM services (Table 2 row 3);

For SMF instance serving the UE, NWDAF may contact UDM through the Nudm_UECM service (Table 2 row 4).

To retrieve the SMS serving nodes related to a specific UE, the HSS shall check UDM for the serving SMSF addresses:

For SMSF address serving 3GPP access, HSS may contact UDM through Nudm_UECM_Get service;

For SMSF address serving non-3GPP access, HSS may contact UDM through Nudm_UECM_Get service.

However UDM only provides UECM service to get one serving node one time, which may result in some problems. For example, retrieving multiple registration data sets (e.g., serving NF instances) with a single GET request is not possible. It is inefficient to support different use cases based on multiple registration data sets, for examples:

to get AMF and SMF instance serving a UE, NWDAF needs to send at least 3 GET requests to the resources (e.g., Amf3GppAccessRegistration, AmfNon3GppAccessRegistration, SmfRegistrations);

to get SMSF instance serving a UE, HSS needs to send at least 2 GET requests to the resources (e.g., Smsf3GppAccessRegistration, SmsfNon3GppAccessRegistration).

To overcome or mitigate at least one above mentioned problems or other problems, the embodiments of the present disclosure propose an improved registration data retrieval solution.

In an embodiment, for a data management entity such as UDM, a new GET method to resource {ueId}/registrations is added as generic registration data sets retrieval method to enable the possibility to retrieve multiple registration data sets with a single GET request.

In an embodiment, for a data repository entity such as UDR, the GET method for the multiple context data sets retrieval is updated to enable the possibility to retrieve multiple context data sets together with the sessions context data (such as SMF PDU sessions context data) with a single GET request.

In a first aspect of the disclosure, there is provided a method performed by a network function service consumer entity. The method comprises sending a request for retrieving at least two registration data sets related to a user equipment to a data management entity. The request includes two or more corresponding registration data set names. The method further comprises receiving a response from the data management entity. The response comprises at least two requested registration data sets related to the user equipment.

In an embodiment, the registration data set name may include at least one of a registration data set name identifying session management function registration information; a registration data set name identifying access and mobility management function, AMF, 3rd generation partnership project, 3GPP, access registration information; a registration data set name identifying AMF Non 3GPP access registration information; a registration data set name identifying short message service function, SMSF, 3GPP access registration information; and a registration data set name identifying SMSF Non 3GPP access registration information.

In an embodiment, when the request includes a registration data set name identifying session management function registration information, the request may further include single network slice selection assistance information and/or a data network name.

In an embodiment, the request may be a hyper text transfer protocol, HTTP, GET request and the response may be an HTTP GET response.

In an embodiment, the HTTP GET response may include a response code 200 OK and a response body containing at least two requested registration data sets related to the user equipment; or a response code 404 Not Found.

In an embodiment, the request may further include a user equipment identity representing the user equipment.

In an embodiment, the user equipment identity may be a subscription permanent identifier, SUPI, or a generic public subscription identifier, GPSI.

In an embodiment, the network function service consumer entity may be a network data analytics function, NWDAF, entity or a home subscriber server, HSS; and/or the data management entity may be a unified data management, UDM, entity.

In a second aspect of the disclosure, there is provided a method performed by a data management entity. The method comprises receiving a request for retrieving at least two registration data sets related to a user equipment from a network function service consumer entity. The request includes two or more corresponding registration data set names. The method further comprises sending a response to the network function service consumer entity. The response comprises at least two requested registration data sets related to the user equipment In an embodiment, the method according to the second aspect of the disclosure may further comprise sending a query request for retrieving at least two registration data sets related to a user equipment to a data repository entity. The query request includes two or more corresponding registration data set names. The method further comprises receiving a query response from the data repository entity. The query response comprises at least two requested registration data sets related to the user equipment.

In an embodiment, the data repository entity may be a unified data repository, UDR, entity.

In a third aspect of the disclosure, there is provided a method performed by a data repository entity. The method comprises receiving a query quest for retrieving at least two registration data sets related to a user equipment from a data management entity. The query request includes two or more corresponding registration data set names. The method further comprises sending a query response to the data management entity. The query response comprises at least two requested registration data sets related to the user equipment.

In an embodiment, the registration data set name further includes at least one of a registration data set name identifying access and mobility management function, AMF, 3rd generation partnership project, 3GPP, access registration information; a registration data set name identifying AMF Non 3GPP access registration information; a registration data set name identifying short message service function, SMSF, 3GPP access registration information; and a registration data set name identifying SMSF Non 3GPP access registration information.

In an embodiment, the query request may be a hyper text transfer protocol, HTTP, GET request and the query response may be an HTTP GET response.

In an embodiment, the data management entity may be a unified data management, UDM, entity, and the data repository entity may be a unified data repository, UDR, entity.

In an embodiment, when the query request includes a registration data set name identifying session management function registration information, the query request further includes single network slice selection assistance information and/or a data network name.

In a fourth aspect of the disclosure, there is provided a network function service consumer entity. The network function service consumer entity comprises a processor; and a memory coupled to the processor, said memory containing instructions executable by said processor, whereby said network function service consumer entity is operative to send a request for retrieving at least two registration data sets related to a user equipment to a data management entity. The request includes two or more corresponding registration data set names. Said network function service consumer entity is further operative to receive a response from the data management entity. The response comprises at least two requested registration data sets related to the user equipment.

In a fifth aspect of the disclosure, there is provided a data management entity. The data management entity comprises a processor; and a memory coupled to the processor, said memory containing instructions executable by said processor, whereby said data management entity is operative to receive a request for retrieving at least two registration data sets related to a user equipment from a network function service consumer entity. The request includes two or more corresponding registration data set names. Said network function service consumer entity is further operative to send a response to the network function service consumer entity. The response comprises at least two requested registration data sets related to the user equipment.

In a sixth aspect of the disclosure, there is provided a data repository entity. The data repository entity comprises a processor; and a memory coupled to the processor, said memory containing instructions executable by said processor, whereby said data repository entity is operative to receive a query quest for retrieving at least two registration data sets related to a user equipment from a data management entity. The query request includes two or more corresponding registration data set names. Said network function service consumer entity is further operative to send a query response to the data management entity. The query response comprises at least two requested registration data sets related to the user equipment.

In a seventh aspect of the disclosure, there is provided a network function service consumer entity. The network function service consumer entity comprises a sending module and a receiving module. The sending module may be configured to send a request for retrieving at least two registration data sets related to a user equipment to a data management entity. The request includes two or more corresponding registration data set names. The receiving module may be configured to receive a response from the data management entity. The response comprises at least two requested registration data sets related to the user equipment.

In an eighth aspect of the disclosure, there is provided a data management entity. The data management entity comprises a receiving module and a sending module. The receiving module may be configured to receive a request for retrieving at least two registration data sets related to a user equipment from a network function service consumer entity. The request includes two or more corresponding registration data set names. The sending module may be configured to send a response to the network function service consumer entity. The response comprises at least two requested registration data sets related to the user equipment.

In a ninth aspect of the disclosure, there is provided a data repository entity. The data repository entity comprises a receiving module and a sending module. The receiving module may be configured to receive a query quest for retrieving at least one registration data set related to a user equipment from a data management entity. The query request includes one or more registration data set names and the registration data set name includes a registration data set name identifying session management function registration information. The sending module may be configured to send a query response to the data management entity.

In a tenth aspect of the disclosure, there is provided a computer program product comprising instructions which, when executed on at least one processor, cause the at least one processor to carry out the method according to the first aspect of the disclosure.

In an eleventh aspect of the disclosure, there is provided a computer program product comprising instructions which, when executed on at least one processor, cause the at least one processor to carry out the method according to the second aspect of the disclosure.

In a twelfth aspect of the disclosure, there is provided a computer program product comprising instructions which, when executed on at least one processor, cause the at least one processor to carry out the method according to the third aspect of the disclosure.

In a thirteenth aspect of the disclosure, there is provided a computer-readable storage medium storing instructions which, when executed on at least one processor, cause the at least one processor to carry out the method according to the first aspect of the disclosure.

In a fourteenth aspect of the disclosure, there is provided a computer-readable storage medium storing instructions which, when executed on at least one processor, cause the at least one processor to carry out the method according to the second aspect of the disclosure.

In a fifteenth aspect of the disclosure, there is provided a computer-readable storage medium storing instructions which, when executed on at least one processor, cause the at least one processor to carry out the method according to the third aspect of the disclosure.

Embodiments herein afford many advantages, of which a non-exhaustive list of examples follows. In some embodiments herein, for data management entity such as UDM, a new GET method on resource {ueId}/registrations is introduced as generic registration data sets retrieval method to enable the possibility to retrieve multiple registration data sets with a single GET request. So use cases which have been identified that benefit from retrieving multiple registration data sets with a single GET request are supported by the proposed method provided by the data management entity. In some embodiments herein, for data repository entity such as UDR, the GET method for the multiple context data sets retrieval is updated to enable the possibility to retrieve multiple context data sets together with the sessions context data (such as SMF PDU sessions context data) with a single GET request. So use cases which have been identified that benefit from retrieving multiple registration data sets including the session context data with a single GET request are supported by the proposed method provided by the data repository entity. In some embodiments herein, unnecessary signaling traffic are avoided and the network efficiency are improved from operation point of view, which means OPEX (operating expenses) reduction. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 shows a flowchart of a method according to an embodiment of the present disclosure;

FIG. 6 shows a flowchart of a method according to another embodiment of the present disclosure;

FIG. 7 shows a flowchart of a method according to another embodiment of the present disclosure;

FIG. 8 shows a flowchart of a method of retrieval of multiple UE registration data sets according to another embodiment of the present disclosure;

FIG. 14 is a block diagram showing a data management entity according to an embodiment of the disclosure; and FIG. 15 is a block diagram showing a data repository entity according to an embodiment of the disclosure.

DETAILED DESCRIPTION

Figure 1A:
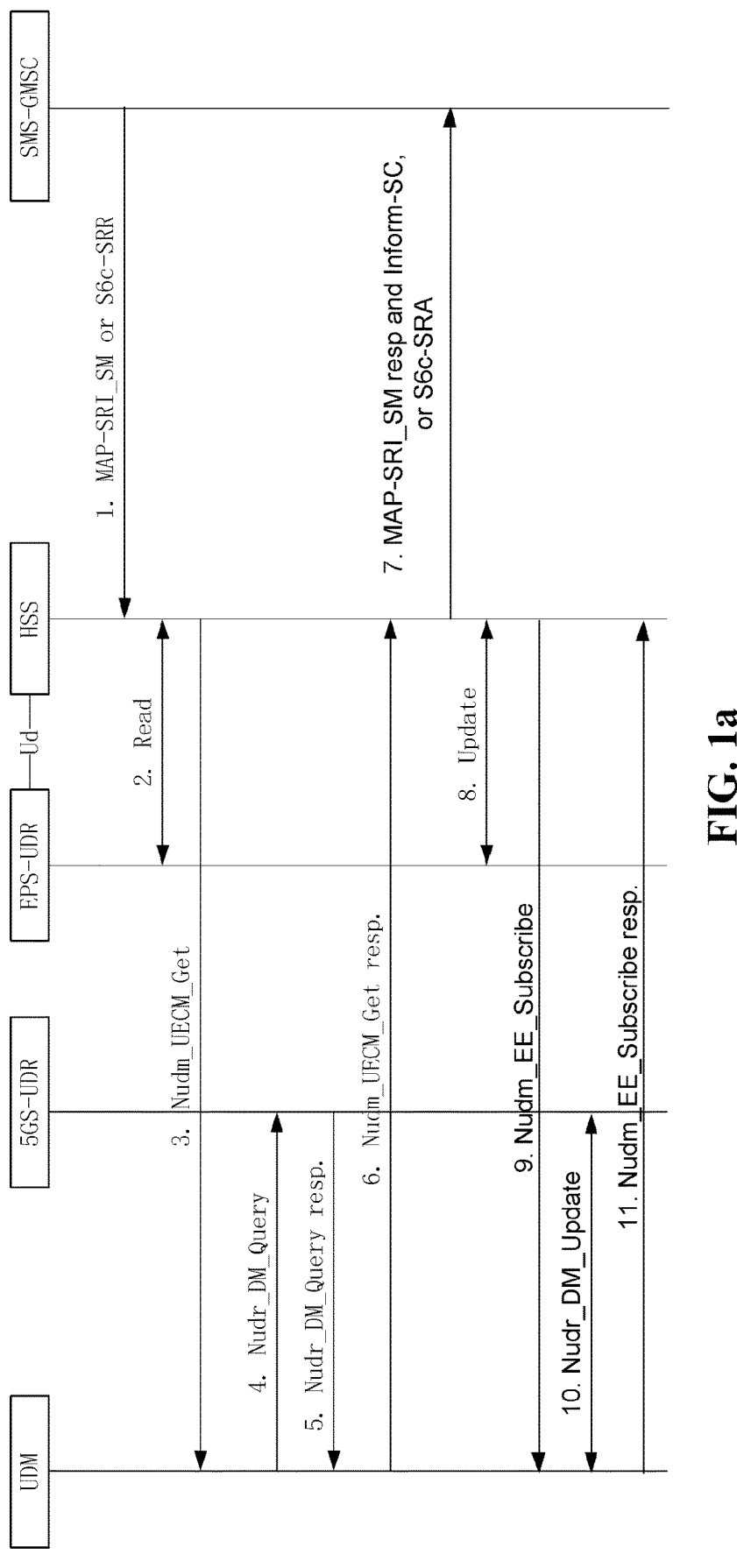
FIG. 1a shows an interaction when the SMS-GMSC retrieves routing information from the HSS for MT-SMS delivery.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" or "communication network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "entity" used herein refers to a network device or network node or network function in a communication network. For example, in a wireless communication network such as a 3GPP-type cellular network, a core network device may offer numerous services to customers who are interconnected by an access network device. Each access network device is connectable to the core network device over a wired or wireless connection.

The term "network function (NF)" refers to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc. In other embodiments, the network function may comprise different types of NFs (such as HSS, SMS-GMSC, EPS-UDR, etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment.

The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

For simplicity, the system architectures of FIGS. 1b-1i only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

Figure 1B:
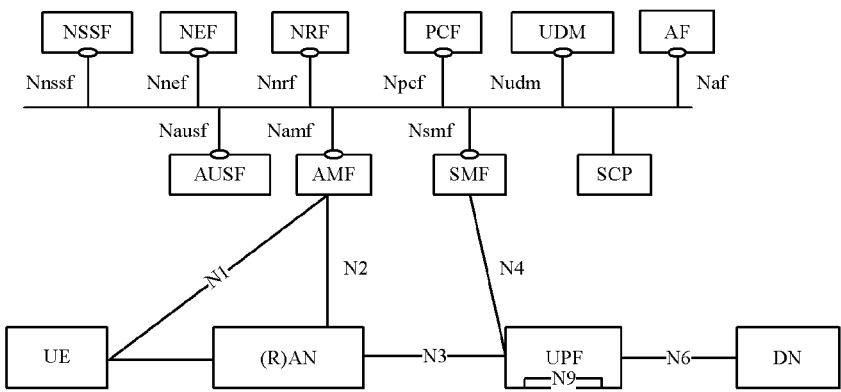
FIG. 1b schematically shows a high level architecture in the next generation network.

FIG. 1B schematically shows a high level architecture in the next generation network such as 5G. The system architecture of FIG. 1B may comprise some exemplary elements such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), RAN (radio access network), SCP (service communication proxy), etc.

In accordance with an exemplary embodiment, the UE can establish a signaling connection with the AMF over the reference point N1, as illustrated in FIG. 1B. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1B, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1B also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Figure 1C:
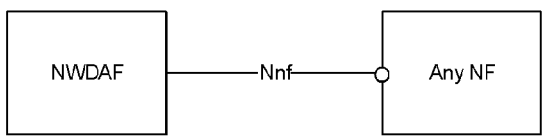
FIG. 1c schematically shows data collection architecture from any NF.

FIG. 1c schematically shows data collection architecture from any NF. As depicted in FIG. 1c, the 5G System architecture allows NWDAF to collect data from any NF. The NWDAF may belong to the same PLMN (Public Land Mobile Network) where the network function that notifies the data is located.

The Nnf interface is defined for the NWDAF to request subscription to data delivery for a particular context, to cancel subscription to data delivery and to request a specific report of data for a particular context.

Figure 1D:
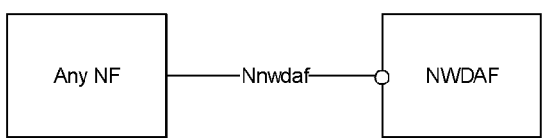
FIG. 1d schematically shows Network Data Analytics Exposure architecture.

FIG. 1d schematically shows Network Data Analytics Exposure architecture. As depicted in FIG. 1d, the 5G System architecture allows any NF to request network analytics information from NWDAF. The NWDAF belongs to the same PLMN where the network function that consumes the analytics information is located. The Nnwdaf interface is defined for the network functions, to request subscription to network analytics delivery for a particular context, to cancel subscription to network analytics delivery and to request a specific report of network analytics for a particular context.

Figure 1E:
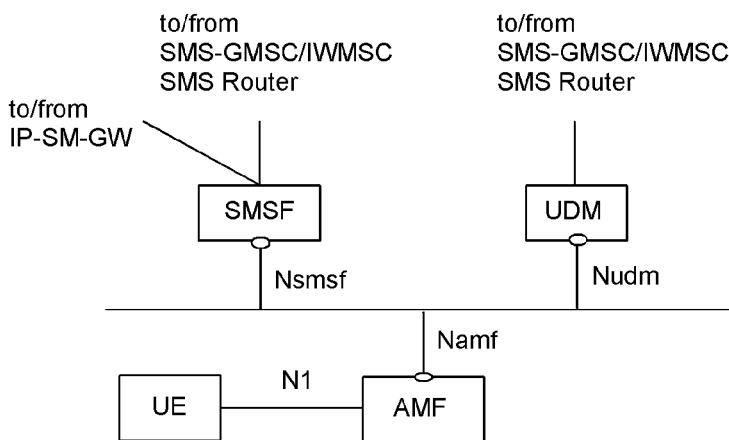
FIG. 1e schematically shows architecture to support SMS (Short Message Service) over NAS.
Figure 1F:
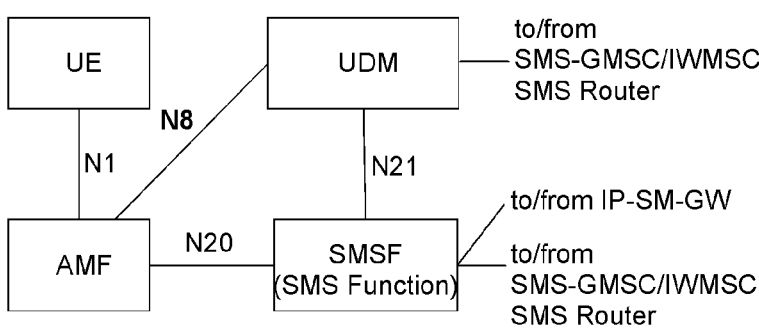
FIG. 1f schematically shows the non-roaming architecture to support SMS over NAS using the reference point representation.

FIG. 1e schematically shows architecture to support SMS over NAS. FIG. 1f schematically shows the non-roaming architecture to support SMS over NAS using the reference point representation.

SMS Function (SMSF) may be connected to the SMS-GMSC/IWMSC (InterWorking MSC)/SMS Router via one of the standardized interfaces as shown in 3GPP TS 23.040. UDM may be connected to the SMS-GMSC/IWMSC/SMS Router via one of the standardized interfaces as shown in 3GPP TS 23.040. When serving AMF is re-allocated for a given UE, the source AMF includes SMSF identifier as part of UE context transfer to target AMF. If the target AMF, e.g. in the case of inter-PLMN mobility, detects that no SMSF has been selected in the serving PLMN, then the AMF performs SMSF selection.

Figure 1G:
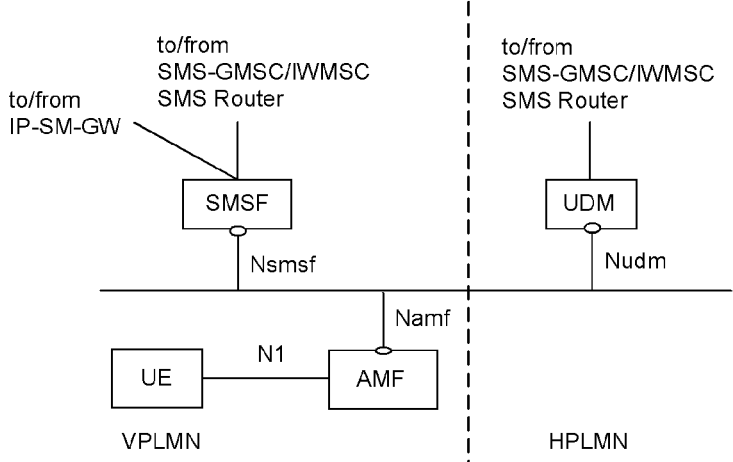
FIG. 1g schematically shows the roaming architecture to support SMS over NAS using the Service-based interfaces within the control plane.
Figure 1H:
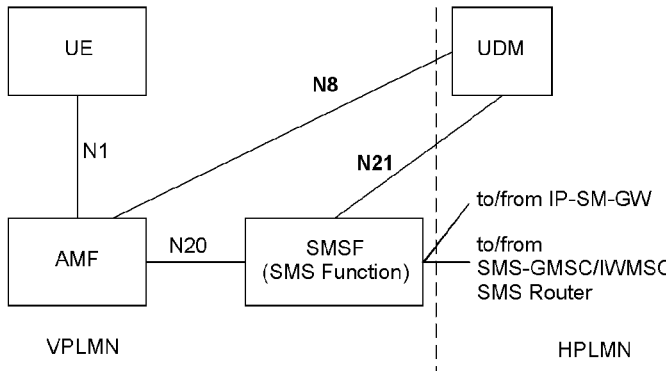
FIG. 1h schematically shows the roaming architecture to support SMS over NAS using the reference point representation.

FIG. 1g schematically shows the roaming architecture to support SMS over NAS using the Service-based interfaces within the control plane. FIG. 1h schematically shows the roaming architecture to support SMS over NAS using the reference point representation.

Reference Point to Support SMS Over NAS

N1: Reference point for SMS transfer between UE and AMF via NAS.

Following reference points are realized by service based interfaces:

N8: Reference point for SMS Subscription data retrieval between AMF and UDM.

N20: Reference point for SMS transfer between AMF and SMS Function.

N21: Reference point for SMS Function address registration management and SMS Management Subscription data retrieval between SMS Function and UDM.

Figure 1I:
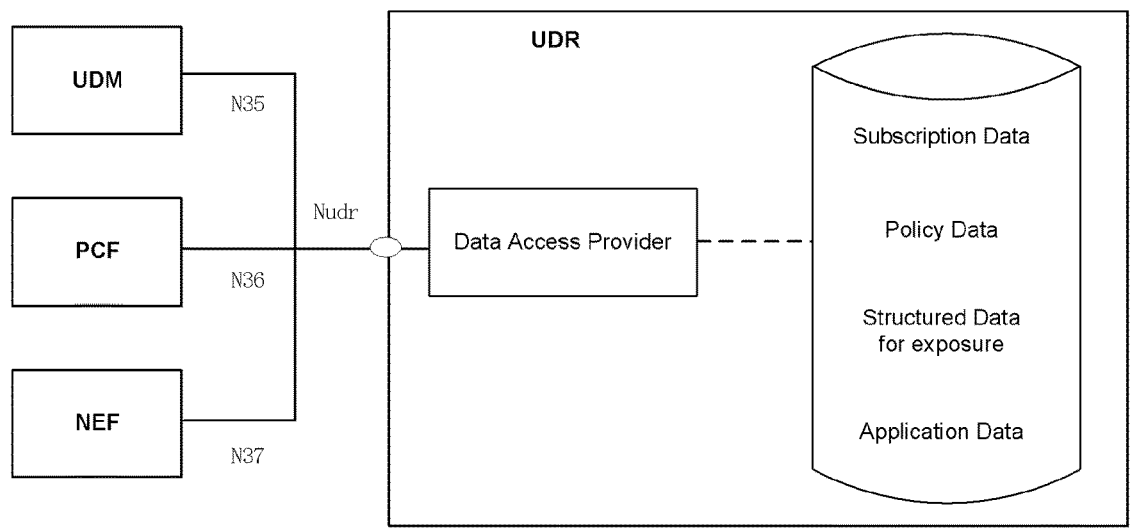
FIG. 1i schematically shows data storage architecture.
Figure 2:
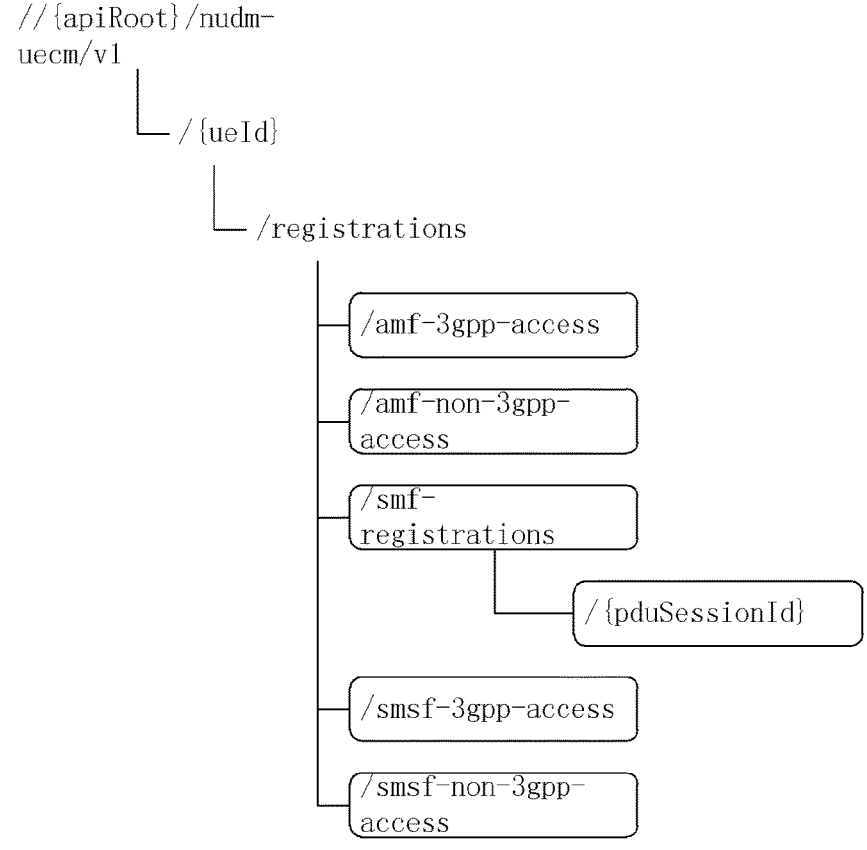
FIG. 2 shows UDM UECM resources.

FIG. 1i schematically shows data storage architecture. As depicted in FIG. 1i, the 5G System architecture allows the UDM, PCF and NEF to store data in the UDR, including subscription data and policy data by UDM and PCF, structured data for exposure and application data (including Packet Flow Descriptions (PFDs) for application detection, AF request information for multiple UEs) by the NEF. UDR can be deployed in each PLMN and it can serve different functions as follows:

UDR accessed by the NEF belongs to the same PLMN where the NEF is located.

UDR accessed by the UDM belongs to the same PLMN where the UDM is located if UDM supports a split architecture.

UDR accessed by the PCF belongs to the same PLMN where the PCF is located.

The UDR deployed in each PLMN can store application data for roaming subscribers. There can be multiple UDRs deployed in the network, each of which can accommodate different data sets or subsets, (e.g. subscription data, subscription policy data, data for exposure, application data) and/or serve different sets of NFs. Deployments where a UDR serves a single NF and stores its data, and, thus, can be integrated with this NF, can be possible.

The internal structure of the UDR is shown for information only.

The Nudr interface is defined for the network functions (i.e. NF Service Consumers), such as UDM, PCF and NEF, to access a particular set of the data stored and to read, update (including add, modify), delete, and subscribe to notification of relevant data changes in the UDR.

Each NF Service Consumer accessing the UDR, via Nudr, shall be able to add, modify, update or delete only the data it is authorised to change. This authorisation shall be performed by the UDR on a per data set and NF service consumer basis and potentially on a per UE, subscription granularity.

The following data in the UDR sets exposed via Nudr to the respective NF service consumer and stored shall be standardized:

Subscription Data,

Policy Data,

Structured Data for exposure,

Application data: Packet Flow Descriptions (PFDs) for application detection and AF request information for multiple UEs.

The service based Nudr interface defines the content and format/encoding of the 3GPP defined information elements exposed by the data sets.

In addition, it shall be possible to access operator specific data sets by the NF Service Consumers from the UDR as well as operator specific data for each data set.

The content and format/encoding of operator specific data and operator specific data sets are not subject to standardization.

The organization of the different data stored in the UDR is not to be standardized.

Various NFs shown in FIGS. 1b-1g may be responsible for functions such as session management, mobility management, authentication, security, etc. The AUSF, AMF, DN, NEF, NRF, NSSF, PCF, SMF, UDM, UPF, AF, UE, (R)AN, SCP, SMSF, NWDAF, etc. may include the functionality for example as defined in 3GPP TS23.501 V16.3.0 or other 3GPP specifications.

Figure 3:
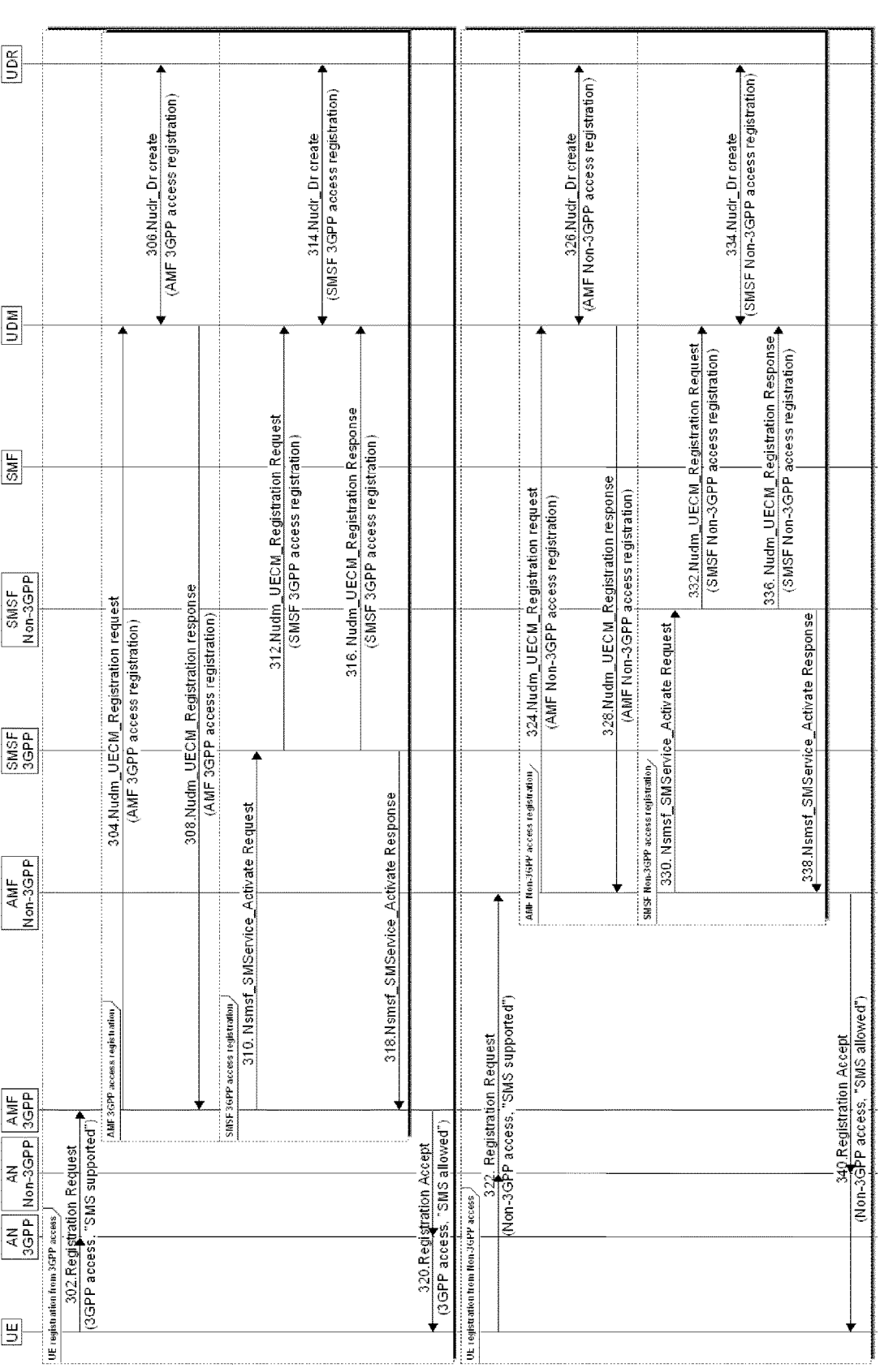
FIG. 3 shows UE registration into 5GC with both 3GPP access and Non-3GPP access according to an embodiment of the present disclosure.

FIG. 3 shows UE registration into 5GC with both 3GPP access and Non-3GPP access according to an embodiment of the present disclosure. FIG. 3 depicts a scenario that UE has registrations into 5GC network from both 3GPP access and non-3GPP access, and the 3GPP access and non-3GPP access belong to separate PLMN (Public Land Mobile Network). Therefore the access networks (AN) are different, denoted as AN(3GPP) and AN(Non-3GPP) accordingly in FIG. 3. The AMFs are also different, denoted as AMF (3GPP) and AMF (non-3GPP) accordingly in FIG. 3. The SMSFs are also different, denoted as SMSF(3GPP) and SMSF (non-3GPP) accordingly in FIG. 3.

At step 302, UE sends a registration request to AMF (3GPP) through AN (3GPP) from the 3GPP access network and indicates its capability to support SMS over NAS (Non-Access Stratum) by set "SMS supported" to true.

At step 304, AMF initiates the UE registration procedure, which may optionally execute the primary authentication procedure which is not shown in FIG. 3 for the sake of simplicity. AMF registers into UDM through Nudm_UECM_Registration for 3GPP access service operation.

At step 306, UDM creates the AMF registration context into UDR through the Nudr-Dr create service operation, so the AMF serving node for UE 3GPP access is stored in the UDR as context data.

At step 308, UDM sends Nudm_UECM_Registration response to AMF for the 3GPP access registration result.

At step 310, as "SMS supported" is indicated in step 302, AMF (3GPP) activates SMS service through Nsmsf_SM-Service_Activate service operation for the 3GPP access towards SMSF (3GPP).

At step 312, SMSF (3GPP) initiates SMSF(3GPP) registration into UDM through the Nudm_UECM_Registration for 3GPP access service operation.

At step 314, UDM creates the SMSF (3GPP) registration context into UDR through Nudr-Dr create service operation, so the SMSF serving node for UE 3GPP access is stored in the UDR as SMSF context data At step 316, UDM sends Nudm_UECM_Registration response to SMSF for the 3GPP access registration result.

At step 318, SMSF sends Nsmsf_SMService_Activate Response to AMF for the 3GPP access SMS service activate result.

At step 320, AMF (3GPP) sends the Registration Accept message to UE through the 3GPP access network and indicates "SMS allowed" as the SMS service registration result.

At step 322, UE sends a registration request to AMF (non-3GPP) through AN (non-3GPP) from the non-3GPP access network and indicates its capability to support SMS over NAS by set "SMS supported" to true.

At step 324, AMF (non-3GPP) initiates the UE registration procedure, which may optionally execute the primary authentication procedure which is not shown in FIG. 3 for the sake of simplicity. AMF registers into UDM through Nudm_UECM_Registration for non-3GPP access service operation.

At step 326, UDM creates the AMF (non-3GPP) registration context into UDR through the Nudr-Dr create service operation, so the AMF serving node for UE non-3GPP access is stored in the UDR as context data.

At step 328, UDM sends Nudm_UECM_Registration response to AMF for the non-3GPP access registration result.

At step 330, as "SMS supported" is indicated in step 322, AMF (non-3GPP) activates SMS service through Nsmsf_SMService_Activate service operation for the non-3GPP access towards SMSF (non-3GPP).

At step 332, SMSF (non-3GPP) initiates SMSF (non-3GPP) registration into UDM through the Nudm_UECM_Registration for non-3GPP access.

At step 334, UDM creates the SMSF registration context into UDR through Nudr-Dr create service operation, so the SMSF serving node for UE non-3GPP access is stored in the UDR as SMSF context data.

At step 336, UDM sends Nudm_UECM_Registration response to SMSF for the non-3GPP access registration result.

At step 338, SMSF(Non-3GPP) sends Nsmsf_SMService_Activate Response to AMF (non-3GPP) for the non-3GPP access SMS service activate result.

At step 340, AMF (non-3GPP) sends the Registration Accept message to UE through the non-3GPP access network and indicates "SMS allowed" as the SMS registration result.

The messages as shown in FIG. 3 are same or similar as the corresponding messages as described in various 3GPP specifications such as 3GPP TS 23.501, V16.3.0, 3GPP TS 23.502, V16.3.0, etc.

Figure 4:
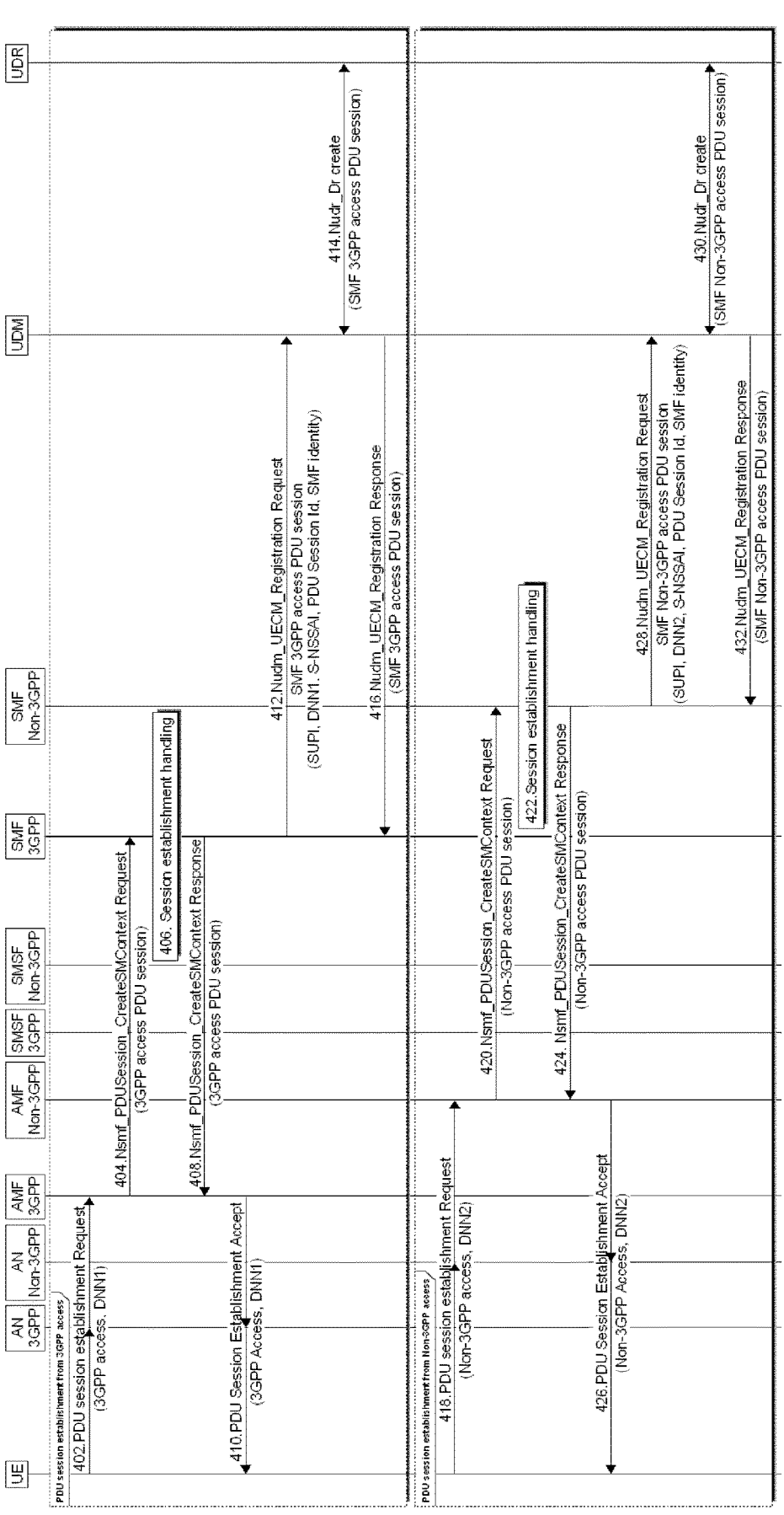
FIG. 4 shows UE initiated PDU session establishment for both 3GPP access and Non-3GPP access according to an embodiment of the present disclosure.

FIG. 4 shows UE initiated PDU session establishment for both 3GPP access and Non-3GPP access according to an embodiment of the present disclosure. FIG. 4 depicts a scenario that UE initiates PDU session establishment from both 3GPP access and non-3GPP access for different data networks, and the 3GPP access and non-3GPP access belong to separate PLMN. The access networks (AN) are different, denoted as AN(3GPP) and AN(Non-3GPP) accordingly in FIG. 4. The Access and Mobility Management Function (AMF) are also different, denoted as AMF (3GPP) and AMF (non-3GPP) accordingly in FIG. 4. The Session Management Function (SMF) are also different, denoted as SMF (3GPP) and SMF (non-3GPP) accordingly in FIG. 4. The data network accessed in 3GPP access and non-3GPP access may be different, denoted as Data Network Name 1 (DNN1) and Data Network Name 2 (DNN2) in step 402 and step 418 accordingly in the PDU session establishment request.

At step 402, UE initiates PDU session establishment in the 3GPP access through the 3GPP access network for DNN1 and sends PDU session establishment request to AMF (3GPP).

At step 404, AMF (3GPP) sends a request to SMF (3GPP) for creation of a new PDU session for 3GPP access and to DNN1 through the Nsmf_PDUSession_CreateSMContext service operation.

At step 406, SMF (3GPP) executes the PDU session establishment procedure, which includes contacting UPF for the N3/N4 sessions which is not shown for the sake of simplicity.

At step 408, SMF (3GPP) sends Nsmf_PDUSession_Cre-ateSMContext response to AMF (3GPP) for the result of the PDU session establishment for the 3GPP access and to DNN1.

At step 410, AMF (3GPP) sends PDU Session Establish-ment Accept message to UE through 3GPP access network for the PDU session to access DNN1.

At step 412, SMF registers the created PDU session into UDM, which includes parameters of UE identity SUPI (subscription permanent identifier), DNN1, S-NSSAI, PDU session identity, SMF identity, etc.

At step 414, UDM creates the SMF PDU session regis-tration context into UDR through Nudr-Dr create service operation, so the SMF serving node for UE 3GPP PDU session and to DNN1 is stored in the UDR as SMF PDU session context data.

At step 416, UDM sends the Nudm_UECM_Registration Response to SMF (3GPP) for the PDU session 1 from 3GPP access and to DNN1.

At step 418, UE initiates PDU session establishment in the non-3GPP access through the non-3GPP access network for DNN2 and sends PDU session establishment request to AMF (non-3GPP).

At step 420, AMF (non-3GPP) sends a request to SMF (non-3GPP) for creation of a new PDU session for non-3GPP access and to DNN2 through the Nsmf_PDUSession_CreateSMContext service operation.

At step 422, SMF (non-3GPP) executes the PDU session establishment procedure, which includes contacting UPF for the N3/N4 sessions which is not shown for the sake of simplicity.

At step 424, SMF (non-3GPP) sends Nsmf_PDUSession_CreateSMContext response to AMF (non-3GPP) for the result of the PDU session establishment for the non-3GPP access and to DNN2.

At step 426, AMF (non-3GPP) sends PDU Session Estab-lishment Accept message to UE through non-3GPP access network for the PDU session to access DNN2.

At step 428, SMF (non-3GPP) registers the created PDU session into UDM, which include parameters of UE identity SUPI, DNN2, S-NSSAI, PDU session identity, SMF iden-tity, etc.

At step 430, UDM creates the SMF PDU session regis-tration context into UDR through Nudr-Dr create service operation, so the SMF serving node for UE non-3GPP PDU session and to DNN2 is stored in the UDR as SMF PDU session context data.

At step 432, UDM sends the Nudm_UECM_Registration Response to SMF (non-3GPP) for the PDU session 2 from 3GPP access and to DNN2.

The messages as shown in FIG. 4 are same or similar as the corresponding messages as described in various 3GPP specifications such as 3GPP TS 23.501, V16.3.0, 3GPP TS 23.502, V16.3.0, etc.

FIG. 5 shows a flowchart of a method according to an embodiment of the present disclosure, which may be per-formed by an apparatus implemented in/as a network func-tion service consumer entity or communicatively coupled to the network function service consumer entity. As such, the apparatus may provide means for accomplishing various parts of the method 500 as well as means for accomplishing other processes in conjunction with other components. The network function service consumer entity may be a network function entity which can retrieve at least one registration data set related to a user equipment from a data management entity. For example, the network function service consumer entity may be NWDAF or HSS.

At block 502, the network function service consumer entity may send a request for retrieving at least two regis-tration data sets related to a user equipment to a data management entity. The request includes two or more cor-responding registration data set names. For example, the network function service consumer entity may send a request for retrieving at least one registration data set related to a user equipment to a data management entity. The registration data set may be any suitable registration data set such as registration context data set. The data management entity may support various functionality such as UE's Serv-ing NF Registration Management (e.g. storing serving AMF for UE, storing serving SMF for UE's PDU Session, storing serving SMSF for UE), MT-SMS delivery support, SMS subscription management, etc. The registration data set related to the user equipment may be stored in the network function service consumer entity, in this case the data management entity may require an internal user data storage. The at least one registration data set related to the user equipment may be stored in a data repository entity such as UDR and the data management entity may use subscription data that may be stored in the data repository entity such as UDR, in which case the data management entity implements the application logic and does not require the internal user data storage and then several different the data management entities may serve the same user in different transactions. In an embodiment, the data management entity may be UDM of 5GC.

In an embodiment, the registration data set name includes at least one of a registration data set name identifying session management function registration information; a registration data set name identifying AMF 3GPP access registration information; a registration data set name iden-tifying AMF Non 3GPP access registration information; a registration data set name identifying SMSF 3GPP access registration information; and a registration data set name identifying SMSF Non 3GPP access registration informa-tion. In other embodiments, the registration data set name may include any other suitable registration data set names identifying other registration information.

In an embodiment, when the request includes two or more registration data set names, two or more corresponding registration data sets related to the user equipment are requested to be retrieved.

In an embodiment, when the request does not include any registration data set name, all registration data sets related to the user equipment are requested to be retrieved.

In an embodiment, when the request includes one regis-tration data set name, said one registration data set name identifies session management function registration information and session management function (SMF) protocol data unit (PDU) session registration information related to the user equipment is requested to be retrieved.

In an embodiment, when the request includes a registration data set name identifying session management function registration information, the request further includes single network slice selection assistance information and/or a data network name. For example, the single network slice selection assistance information may be SNSSAI as described in 3GPP TS23.501 V16.3.0.

In an embodiment, the request further includes a user equipment identity representing the user equipment. For example, the user equipment identity (ueid) may represents the Subscription Identifier such as SUPI or GPSI (generic public subscription identifier) (see clause 5.9.2 of 3GPP TS 23.501 V16.3.0). SUPI (i.e., imsi (international mobile subscriber identity) or nai (network access identifier)) may be used with the HTTP PUT and PATCH methods; SUPI (i.e. imsi or nai) or GPSI (i.e., msisdn (mobile subscriber integrated services digital network number) or extid) may be used with the GET method. For example, a pattern may be "(imsi-[0-9]{5,15}|nai-.+|msisdn-[0-9]{5,15}|extid-[^@]+@[^@]+|+)". The term "extid" is same as "extid" as described in 3GPP 29.503 16.2.0.

At block 504, the network function service consumer entity may receive a response from the data management entity. In an embodiment, the response comprises at least two requested registration data sets related to the user equipment. For example, upon success, the response containing the requested at least one registration data set may be returned. On failure, error information may be returned in the response.

In an embodiment, the request may be an HTTP GET request and the response may be an HTTP GET response. In other embodiments, the request may be other type of request and the response may be other type of response.

In an embodiment, the HTTP GET response may include a response code 200 OK and a response body containing the requested at least one (e.g. at least two requested) registration data set related to the user equipment or a response code 404 Not Found. For example, on failure, the appropriate HTTP status code indicating the error may be returned and appropriate additional error information may be returned in the GET response body.

FIG. 6 shows a flowchart of a method according to another embodiment of the present disclosure, which may be performed by an apparatus implemented in/as a data management entity or communicatively coupled to the data management entity. As such, the apparatus may provide means for accomplishing various parts of the method 600 as well as means for accomplishing other processes in conjunction with other components. The data management entity may be a network function entity which can support data management functionality. For example, the data management entity may be UDM of 5GS. For some parts which have been described in the above embodiments, detailed description thereof is omitted here for brevity.

At block 602, the data management entity may receive a request for retrieving at least two registration data sets related to a user equipment from a network function service consumer entity. The request includes two or more corresponding registration data set names. For example, the data management entity may receive a request for retrieving at least one registration data set related to a user equipment from a network function service consumer entity. For example, the network function service consumer entity may send the request at block 502 of FIG. 5, and then the data management entity may receive this request.

In an embodiment, the registration data set name may include at least one of a registration data set name identifying session management function registration information; a registration data set name identifying AMF 3GPP access registration information; a registration data set name identifying AMF Non 3GPP access registration information; a registration data set name identifying SMSF 3GPP access registration information; and a registration data set name identifying SMSF Non 3GPP access registration information.

In an embodiment, when the request includes two or more registration data set names, two or more corresponding registration data sets related to the user equipment are requested to be retrieved. For example, the data management entity may query the two or more corresponding registration data sets related to the user equipment from a data repository entity such as UDR.

In an embodiment, when the request does not include any registration data set name, all registration data sets related to the user equipment are requested to be retrieved. For example, the data management entity may query all registration data sets related to the user equipment from a data repository entity such as UDR.

In an embodiment, when the request includes one registration data set name, said one registration data set name identifies session management function registration information and session management function protocol data unit session registration information related to the user equipment is requested to be retrieved. For example, the data management entity may query the session management function protocol data unit session registration information related to the user equipment from a data repository entity such as UDR.

In an embodiment, when the request includes a registration data set name identifying session management function registration information, the request further includes single network slice selection assistance information and/or a data network name. For example, the single network slice selection assistance information may be SNSSAI as described in 3GPP TS23.501 V16.3.0. For example, to determine the SMF serving a PDU session, the NWDAF may provide the DNN and S-NSSAI of this PDU session; otherwise the NWDAF may obtain a list of possibly multiple SMFs (e.g., one per PDU session).

In an embodiment, the request further includes a user equipment identity representing the user equipment. The user equipment identity may be SUPI or GPSI.

At block 604 (optionally), the data management entity may send a request for retrieving at least two registration data sets related to a user equipment to a data repository entity. The request includes two or more corresponding registration data set names. For example, the data management entity may send a query quest for retrieving the at least one registration data set related to the user equipment to a data repository entity. The data repository entity may store various registration data sets related to the user equipment. In an embodiment, the data repository entity may be UDR of 5GS. The registration data set may be registration context data set.

At block 606 (optionally), the data management entity may receive a query response from the data repository entity. For example, upon success, the query response containing the requested at least one registration data set may be returned. On failure, error information may be returned in the query response. In an embodiment, the response comprises at least two requested registration data sets related to the user equipment.

In an embodiment, when the requested at least one registration data set is stored in the data management entity, the data management entity may query the requested at least one registration data by itself and blocks 604 and 606 may be omitted.

At block 608, the data management entity may send a response to the network function service consumer entity. In an embodiment, the response comprises at least two requested registration data sets related to the user equipment. For example, upon success, the response containing the requested at least one registration data set may be returned. On failure, error information may be returned in the response.

In an embodiment, the request may be an HTTP GET request and the response may be an HTTP GET response. In other embodiments, the request may be other type of request and the response may be other type of response.

In an embodiment, the HTTP GET response may include a response code 200 OK and a response body containing the requested at least one (e.g. at least two requested) registration data set related to the user equipment or a response code 404 Not Found. For example, on failure, the appropriate HTTP status code indicating the error may be returned and appropriate additional error information may be returned in the GET response body.

FIG. 7 shows a flowchart of a method according to another embodiment of the present disclosure, which may be performed by an apparatus implemented in/as a data repository entity or communicatively coupled to the data repository entity. As such, the apparatus may provide means for accomplishing various parts of the method 700 as well as means for accomplishing other processes in conjunction with other components. The data repository entity may be a network function entity which can support data repository functionality. For example, the data repository entity may be UDR of 5GS. For some parts which have been described in the above embodiments, detailed description thereof is omitted here for brevity.

At block 702, the data repository entity may receive a query quest for retrieving at least two registration data sets related to a user equipment from a data management entity, wherein the query request includes two or more corresponding registration data set names. For example, the data repository entity may receive a query quest for retrieving at least one registration data set related to a user equipment from a data management entity. The registration data set may be registration context data set. The query request includes one or more registration data set names and the registration data set name includes a registration data set name identifying session management function registration information. For example, the data management entity may send the query quest at block 604 of FIG. 6, and then the data repository entity may receive the query quest.

At block 704, the data repository entity may send a query response to the data management entity. For example, upon success, the query response containing the requested at least one registration data set may be returned. On failure, error information may be returned in the query response. In an embodiment, the query response comprises at least two requested registration data sets related to the user equipment.

In an embodiment, the registration data set name further includes at least one of a registration data set name identifying AMF 3GPP access registration information; a registration data set name identifying AMF Non 3GPP access registration information; a registration data set name identifying SMSF 3GPP access registration information; and a registration data set name identifying SMSF Non 3GPP access registration information.

In an embodiment, the query request is an HTTP GET request and the query response is an HTTP GET response.

In an embodiment, when the query request includes a registration data set name identifying session management function registration information, the query request further includes single network slice selection assistance information and/or a data network name.

FIG. 8 shows a flowchart of a method of retrieval of multiple UE registration data sets according to another embodiment of the present disclosure. FIG. 8 depicts a scenario where the NF service consumer (e.g. NWDAF, HSS) sends a request to the UDM to receive multiple UE registration data sets. In this example scenario the UE's 3GPP AMF and the UE's non-3GPP AMF registration data are retrieved with a single request. It is noted that any other registration data sets can be retrieved with a single request. The request contains the UE's registrations ({ueId}/registrations) and query parameters identifying the requested registration data sets (in this example: ?registration-dataset-names=AMF_3GPP, AMF_NON_3GPP).

At step 802, the NF Service Consumer (e.g. NWDAF, HSS) sends a GET request to the resource representing the UE registrations. Query parameters indicate the requested UE registration data sets.

At step 804, the UDM responds with "200 OK" with the message body containing the requested UE registration data sets. On failure, the appropriate HTTP status code indicating the error shall be returned and appropriate additional error information may be returned in the GET response body.

In an embodiment, the above Table 3 may be added with Registrations resource as following:

| Resource name (Archetype) | Resource URI | HTTP method or custom operation | Description |
|---|---|---|---|
| Reqistrations (Document) | /{ueId}/registrations | GET | Retrieve UE's registration data sets |
| Amf3GppAccessRegistration (Document) | /{ueId}/registrations/amf-3gpp-access | PUT | Update the AMF registration for 3GPP access |
| | | PATCH | Modify the AMF registration for 3GPP access |
| | | GET | Retrieve the AMF registration information for 3GPP access |

-continued

| Resource name (Archetype) | Resource URI | HTTP method or custom operation | Description |
|---|---|---|---|
| AmfNon3GppAccessRegistration (Document) | /{ueId}/registrations/amf-non-3gpp-access | PUT | Update the AMF registration for non 3GPP access |
| | | PATCH | Modify the AMF registration for non 3GPP access |
| | | GET | Retrieve the AMF registration information for non 3GPP access |
| SmfRegistrations (Store) | /{ueId}/registrations/smf-registrations | GET | Retrieve the SMF registration information |
| IndividualSmfRegistration (Document) | /{ueId}/registrations/smf-registrations/{pduSessionId} | PUT | Create an SMF registration identified by PDU Session Id |
| | | DELETE | Delete an individual SMF registration |
| | | PATCH | Modify an individual SMF Registration |
| Smsf3GppAccessRegistration (Document) | /{ueId}/registrations/smsf-3gpp-access | PUT | Create or Update the SMSF registration |
| | | DELETE | Delete the SMSF registration for 3GPP access |
| | | PATCH | Modify the SMSF registration |
| | | GET | Retrieve the SMSF registration information |
| SmsfNon3GppAccessRegistration (Document) | /{ueId}/registrations/smsf-non-3gpp-access | PUT | Create or Update the SMSF registration for non 3GPP access |
| | | DELETE | Delete the SMSF registration for non 3GPP access |
| | | PATCH | Modify the SMSF registration for non 3GPP access |
| | | GET | Retrieve the SMSF registration information for non 3GPP access |

In an embodiment, the following content may be added in 3GPP 29.503 16.2.0:

6.2.3.X Resource: Registrations 6.2.3.X.1 Description

This resource represents the UE's registration data.

6.2.3.X.2 Resource Definition

Resource URI: {apiRoot}/nudm-uecm/v1/{ueId}/registrations

This resource shall support the resource URI variables defined in table 6.2.3.X.2-1.

TABLE 6.2.3.X.2-1

| Resource URI variables for this resource | |
|---|---|
| Name | Definition |
| apiRoot | See clause 6.2.1 |
| ueId | Represents the Subscription Identifier SUPI or GPSI (see 3GPP TS 23.501 [2] clause 5.9.2) SUPI (i.e. imsi or nai) is used with the PUT and PATCH methods; SUPI (i.e. imsi or nai) or GPSI (i.e. msisdn or extid) is used with the GET method. pattern: "(imsi-[0-9]{5,15}\|nai-.+\|msisdn-[0-9]{5,15}\|extid-[^@]+@[^@]+\|.+)" |

6.2.3.X.3 Resource Standard Methods 6.2.3.X.3.1 GET

This method shall support the URI query parameters specified in table 6.2.3.X.3.1-1.

NOTE: The retrieval of these registration data sets can also be achieved by sending individual GET requests to the corresponding sub-resources under the {ueId}/registrations resource. When multiple registration data sets need to be retrieved by the NF Service consumer, it is recommended to use a single GET request with query parameters rather than issuing multiple GET requests.

TABLE 6.2.3.X.3.1-1

| URI query parameters supported by the GET method on this resource | | | | |
|---|---|---|---|---|
| Name | Data type | P | Cardinality | Description |
| registration-dataset-names | array(RegistrationDataSetName) | o | 0..N | If included, this IE shall contain the names of registration context data sets to be retrieved. If not included, all registration context data sets shall be returned. |
| supported-features | SupportedFeatures | o | 0..1 | see 3GPP TS 29.500 [4] clause 6.6 |
| single-nssai | Snssai | o | 0..1 | Only applicable for registration-dataset-names=SMF_PDU_SESSIONS |
| dnn | Dnn | o | 0..1 | The DNN shall be the DNN Network Identifier only. Only applicable for registration-dataset-names=SMF_PDU_SESSIONS |

This method shall support the request data structures specified in table 6.2.3.X.3.1-2 and the response data structures and response codes specified in table 6.2.3.X.3.1-3.

TABLE 6.2.3.X.3.1-2

| Data structures supported by the GET Request Body on this resource | | | |
|---|---|---|---|
| Data type | P | Cardinality | Description |
| n/a | | | |

TABLE 6.2.3.X.3.1-3

| Data structures supported by the GET Response Body on this resource | | | | |
|---|---|---|---|---|
| Data type | P | Cardinality | Response codes | Description |
| RegistrationDataSets | M | 1 | 200 OK | Upon success, a response body containing all the UE registrations shall be returned. |
| ProblemDetails | M | 1 | 404 Not Found | The "cause" attribute shall be set to one of the following application errors:<br>- CONTEXT_NOT_FOUND<br>- USER_NOT_FOUND |

NOTE: In addition common data structures as listed in table 6.2.7-1 are supported.

The proposed data model is as following:

6.2.6.2.X Type: RegistrationDataSets

TABLE 6.2.6.2.X-1

| Definition of type Registration DataSets | | | | |
|---|---|---|---|---|
| Attribute name | Data type | P | Cardinality | Description |
| amf3Gpp | Amf3GppAccessRegistration | o | 1 | AMF 3GPP Access Registration |
| amfNon3Gpp | AmfNon3GppAccessRegistration | o | 1 | AMF Non 3GPP Access Registration |
| smfRegistration | SmfRegistrationInfo | o | 0..N | SMF Registration Information |
| smsf3Gpp | SmsfRegistration | o | 0..1 | SMSF 3GPP Access Registration |
| smsfNon3Gpp | SmsfRegistration | o | 0..1 | SMSF Non 3GPP Access Registration |

6.2.6.3.X Enumeration: RegistrationDataSetName

TABLE 6.1.6.3.3-1

| Enumeration RegistrationDataSetName | |
| --- | --- |
| Enumeration value | Description |
| "AMF_3GPP" | AMF 3GPP Access Registration |
| "AMF_NON_3GPP" | AMF Non 3GPP Access Registration |
| "SMF_PDU_SESSIONS" | SMF PDU Session Registration |
| "SMSF_3GPP" | SMSF 3GPP Access Registration |
| "SMSF_NON_3GPP" | SMSF Non 3GPP Access Registration |

In an embodiment, the UDR method may be updated to support the retrieval of SMF PDU session contexts in the request for multiple context data sets. Following are the updates on the data models which can be added in 3GPP TS 29.505 16.1.0:

5.4.2.22 Type: ContextDataSets

TABLE 5.4.2.22-1

| ContextDataSets | | | | |
| --- | --- | --- | --- | --- |
| Attribute name | Data type | P | Cardinality | Description |
| amf3Gpp | Amf3GppAccessRegistration | O | 0..1 | AMF 3GPP Access registration |
| amfNon3Gpp | AmfNon3GppAccess Registration | O | 0..1 | AMF Non 3GPP Access registration |
| sdmSubscriptions | array(SdmSubscription) | O | 1..N | SDM-Subscri ptions |
| eeSubscriptions | array(EeSubscription) | O | 1..N | Event Exposure Subscriptions |
| smsf3GppAccess | SmsfRegistration | O | 0..1 | SMSF 3GPP Access registration |
| smsfNon3GppAccess | SmsfRegistration | O | 0..1 | SMSF Non 3GPP Access registration |
| subscriptionDataSubscriptions | array(Subscription DataSubscriptions) | O | 1..N | This attribute contain the Subscription Data Subscriptions (subs-to-notify) associated with the Notification. |
| smfRegistration | smfRegistrationInfo | O | 0..1 | SMF registration for PDU sessions |

5.4.3.6 Enumeration: ContextDataSetName

TABLE 5.4.3.6-1

| Enumeration ContextDataSetName | |
| --- | --- |
| Enumeration value | Description |
| "AMF_3GPP" | AMF 3GPP Access Registration |
| "AMF_NON_3GPP" | SMF Non 3GPP Access Registration |
| "SDM_SUBSCRIPTIONS" | SDM Subscriptions |
| "EE_SUBSCRIPTIONS" | EE Subscriptions |
| "SMSF_3GPP" | SMSF 3GPP Access Registration |
| "SMSF_NON3GPP" | SMSF Non 3GPP Access Registration |
| "SUBS_TO_NOTIFY" | UDR Subscriptions |
| "SMF_PDU_SESSIONS" | SMF registration for PDU sessions |

Figure 9:
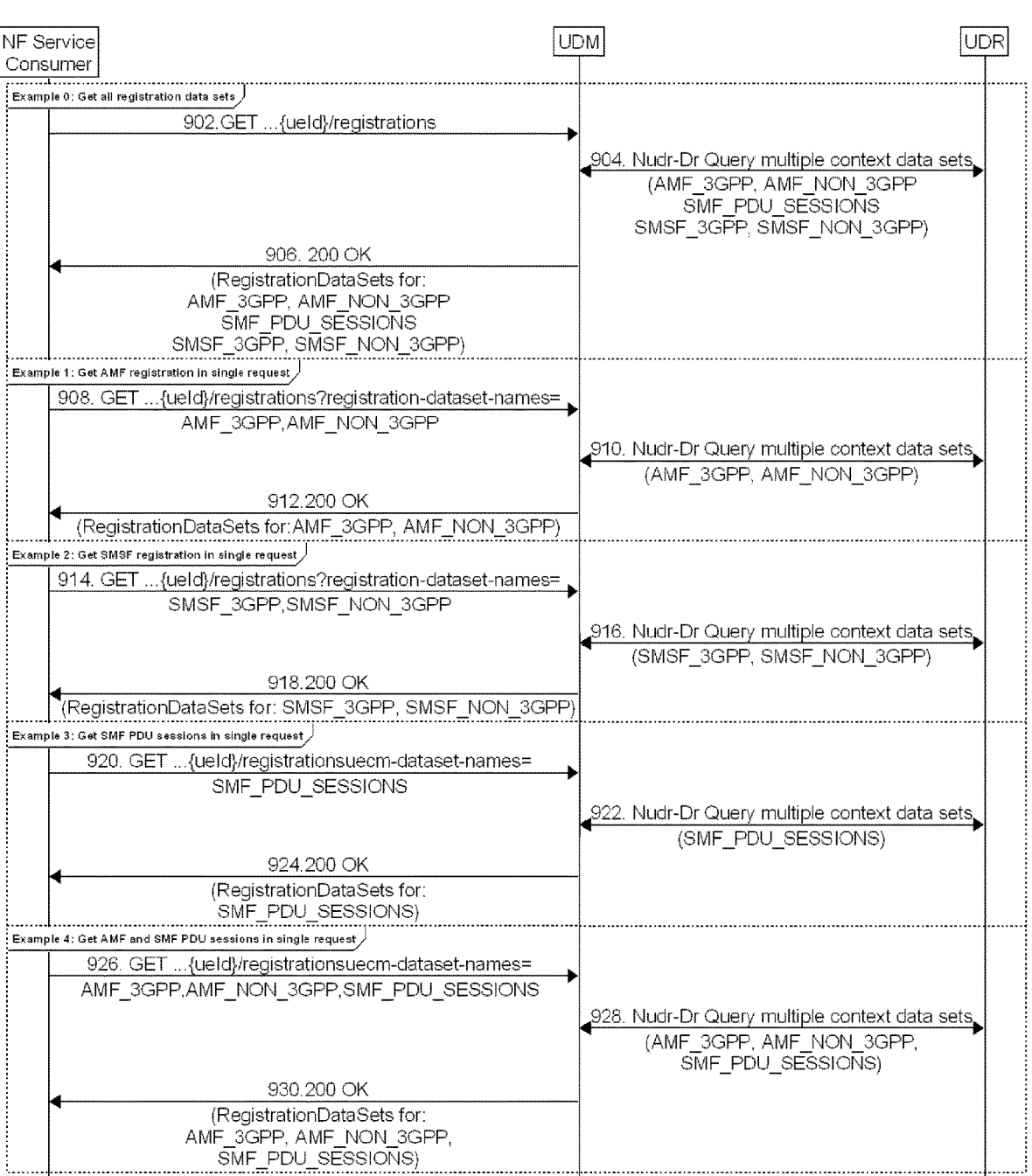
FIG. 9 shows a flowchart of some example use cases for getting multiple registration data sets in single request according to another embodiment of the present disclosure.

FIG. 9 shows a flowchart of some example use cases for getting multiple registration data sets in single request according to another embodiment of the present disclosure.

Example 0: Retrieve all UE registration data sets from UDM, and UDM queries all UE registration related data sets from UDR. Example 1: Retrieve all AMF registration data sets from UDM, and UDM queries AMF registration related data sets from UDR. Example 2: Retrieve all SMSF registration data sets from UDM, and UDM queries SMSF registration related data sets from UDR. Example 3: Retrieve all SMF PDU session registration data sets from UDM, and UDM queries SMF PDU session registration related data sets from UDR. Example 4: Retrieve all AMF registration and SMF PDU session registration data sets from UDM, and UDM queries SMF PDU session registration related data sets from UDR.

At step 902, the NF service consumer gets all UE registration data sets from UDM without any specification of the required registration data sets in the query parameter through the GET method on the resource . . . /{ueId}/registrations.

At step 904, UDM queries multiple context data sets from UDR in one single request and sets the requested context-dataset-names=AMF_3GPP, AMF_NON_3GPP, SMF_P-DU_SESSIONS, SMSF_3GPP, SMSF_NON_3GPP.

At step 906, UDM returns to the NF service consumer the result from UDR, which could include all required registration data sets in the RegistrationDataSets: Amf3GppAccessRegistration (identified by AMF_3GPP in the request), AmfNon3GppAccessRegistration (identified by AMF_NON_3GPP in the request), SmfRegistrationInfo (identified by SMF_PDU_SESSIONS in the request, a list of PDU sessions), SmsfRegistration for 3GPP access (identified by SMSF_3GPP in the request), SmsfRegistration for non-3GPP access (identified by SMSF_NON_3GPP in the request).

At step 908, the NF service consumer gets all UE AMF registration data sets from UDM with specification of the required registration data set in the query parameter through the GET method on the resource . . . /{ueId}/registrations?registration-dataset-names=AMF_3GPP, AMF_NON_3GPP.

At step 910, UDM queries multiple context data sets from UDR in one single request and sets the requested context-dataset-names=AMF_3GPP, AMF_NON_3GPP.

At step 912, UDM returns to the NF service consumer the result from UDR, which could include all required registration data sets in the RegistrationDataSets: Amf3GppAccessRegistration (identified by AMF_3GPP in the request), AmfNon3GppAccessRegistration (identified by AMF_NON_3GPP in the request).

At step 914, the NF service consumer gets all UE SMSF registration data sets from UDM with specification of the required registration data set in the query parameter through the GET method on the resource . . . /{ueId}/registrations?registration-dataset-names=SMSF_3GPP, SMSF_NON_3GPP.

At step 916, UDM queries multiple context data sets from UDR in one single request and sets the requested context-dataset-names=SMSF_3GPP, SMSF_NON_3GPP.

At step 918, UDM returns to the NF service consumer the result from UDR, which could include all required registration data sets in the RegistrationDataSets: SmsfRegistration for 3GPP access (identified by SMSF_3GPP in the request), SmsfRegistration for non-3GPP access (identified by SMSF_NON_3GPP in the request).

At step 920, the NF service consumer gets all SMF PDU session registration data sets from UDM with specification of the required registration data set in the query parameter through the GET method on the resource . . . /{ueId}/registrations?registration-dataset-names=SMF_PDU_SEESIONS.

At step 922, UDM queries multiple context data sets from UDR in one single request and sets the requested context-dataset-names=SMF_PDU_SEESIONS.

At step 924, UDM returns to the NF service consumer the result from UDR, which could include all required registration data sets in the RegistrationDataSets: SmfRegistration-Info (identified by SMF_PDU_SESSIONS in the request, a list of PDU sessions).

At step 926, the NF service consumer gets all UE AMF registration and SMF PDU session registration data sets from UDM with specification of the required registration data set in the query parameter through the GET method on the resource . . . /{ueId}/registrations?registration-dataset-names=AMF_3GPP, AMF_NON_3GPP, SMF_PDU_SEESIONS.

At step 928, UDM queries multiple context data sets from UDR in one single request and sets the requested context-dataset-names=AMF_3GPP, AMF_NON_3GPP, SMF_P-DU_SEESIONS.

At step 930, UDM returns to the NF service consumer the result from UDR, which could include all required registration data sets in the RegistrationDataSets: Amf3GppAccessRegistration (identified by AMF_3GPP in the request), AmfNon3GppAccessRegistration (identified by AMF_NON_3GPP in the request), SmfRegistrationInfo (identified by SMF_PDU_SESSIONS in the request, a list of PDU sessions).

Some messages as shown in FIG. 9 are similar as the corresponding messages as described in various 3GPP specifications such as 3GPP TS 23.501, V16.3.0, 3GPP TS 23.502, V16.3.0, etc.

Figure 10:
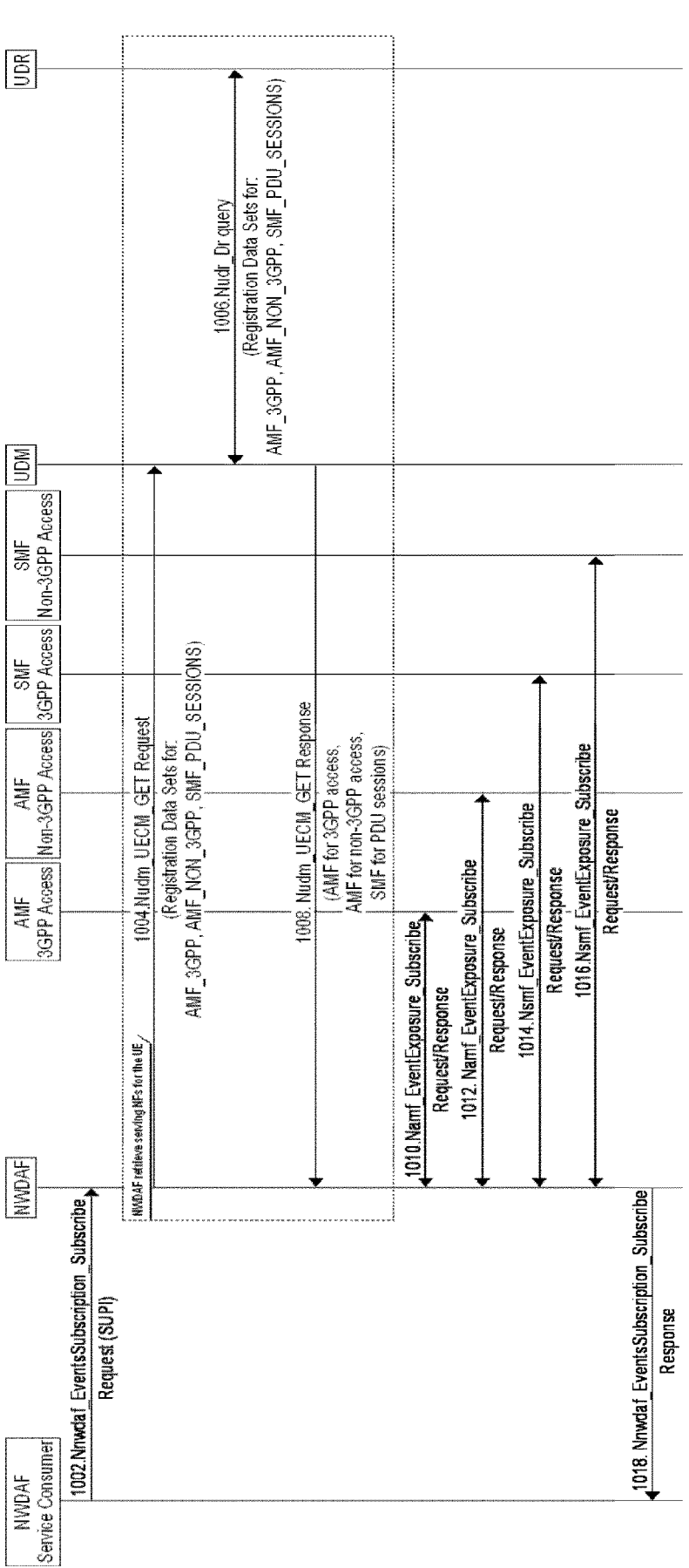
FIG. 10 shows a flowchart of NWDAF related use case for getting multiple registration data sets in single request according to another embodiment of the present disclosure.

FIG. 10 shows a flowchart of NWDAF related use case for getting multiple registration data sets in single request according to another embodiment of the present disclosure. In this embodiment, the NF service consumer is NWDAF.

At step 1002, a NWDAF service consumer subscribes a data analytics report for a UE from NWDAF.

NWDAF firstly needs to get the currently serving nodes for the UE. So, the proposed method is used by NWDAF to retrieve the serving AMF and SMF instances from UDM in a single request. At step 1004, NWDAF gets all UE AMF registration and SMF PDU session registration data sets from UDM with specification of the required registration data sets in the query parameter through the GET method on the resource . . . /{ueId}/registrations?registration-dataset-names=AMF_3GPP, AMF_NON_3GPP, SMF_PDU_SEESIONS.

At step 1006, UDM queries multiple context data sets from UDR in one single request and sets the requested context-dataset-names=AMF_3GPP, AMF_NON_3GPP, SMF_PDU_SEESIONS.

At step 1008, UDM returns to the NF service consumer the result from UDR, which could include all registration data sets in the RegistrationDataSets: Amf3GppAccessRegistration (identified by AMF_3GPP in the request), AmfNon3GppAccessRegistration (identified by AMF_NON_3GPP in the request), SmfRegistrationInfo (identified by SMF_PDU_SESSIONS in the request, a list of PDU sessions).

At step 1010, NWDAF subscribes UE access and mobility related events from AMF (3GPP access) whose information is got in step 1008.

At step 1012, NWDAF subscribes UE access and mobility related events from AMF (non-3GPP access) whose information is got in step 1008.

At step 1014, NWDAF subscribes UE PDU session related events from SMF (3GPP access) whose information is got in step 1008.

At step 1016, NWDAF subscribes UE PDU session related events from SMF (non-3GPP access) whose information is got in step 1008.

At step 1018, NWDAF responds NWDAF service consumer the result of the data analytics report subscription.

Some messages as shown in FIG. 10 are similar as the corresponding messages as described in various 3GPP specifications such as 3GPP TS 23.501, V16.3.0, 3GPP TS 23.502, V16.3.0, etc.

Figure 11:
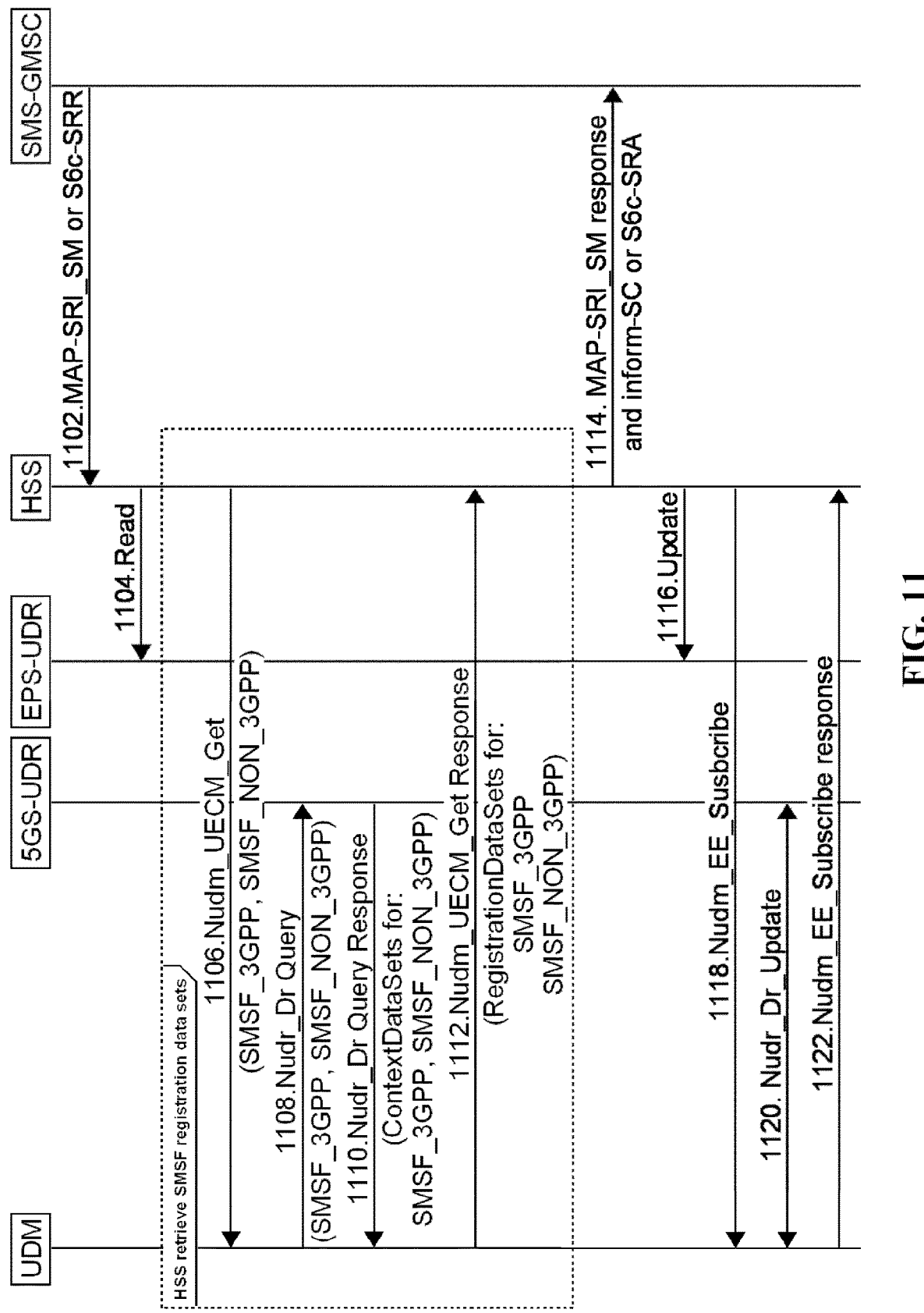
FIG. 11 shows a flowchart of HSS related use case for getting multiple registration data sets in single request according to another embodiment of the present disclosure.

FIG. 11 shows a flowchart of HSS related use case for getting multiple registration data sets in single request according to another embodiment of the present disclosure. In this embodiment, the NF service consumer is HSS.

At step 1102, the HSS receives a request for routing information from the SMS-GMSC via MAP or S6c.

At step 1104, the HSS queries the EPS-UDR via Ud to read the registered MME/MSC, the registered SGSN, the UE-not-reachable flags for MME/MSC, SGSN, 3GppSMSF and Non3GppSMSF and the SMSF Registration Notification flag.

At step 1106, if the UE-not-reachable flags for 3GppSMSF, Non3GppSMSF and SMSF Registration Notification flag are not set and unless the user is known not to be registered in 5GC, the HSS retrieves the registered SMSF addresses (if any) from the UDM. HSS uses the proposed method to get all UE SMSF registration data sets from UDM with specification of the required registration data set in the query parameter through the GET method on the resource . . . /{ueId}/registrations?registration-dataset-names=SMSF_3GPP, SMSF_NON_3GPP.

At steps 1108-1110, the UDM retrieves the requested information from the 5GS-UDR. UDM queries multiple context data sets in one single request and set the requested context-dataset-names=SMSF_3GPP, SMSF_NON_3GPP.

At step 1112, the UDM forwards the retrieved addresses to the HSS if any. UDM returns to the NF service consumer the result from UDR, which could include all required registration data sets in the RegistrationDataSets: SmsfRegistration for 3GPP access (identified by SMSF_3GPP in the request), SmsfRegistration for non-3GPP access (identified by SMSF_NON_3GPP in the request).

At step 1114, the HSS returns the relevant MT-SMS target node addresses registered in HSS and/or UDM to the SMS-GMSC and the procedure is terminated. Otherwise, if there is no MT-SMS target node address registered in HSS nor in UDM, a negative response (Absent Subscriber SM) is sent to the SMS-GMSC and the procedure continues with steps 1116 to 1122.

At step 1116, the HSS includes the SMSC address to the Message Waiting Data (MWD) stored in the EPS-UDR and informs the SMSC as defined in 3GPP TS 23.040. The relevant UE-not-reachable flags and the SMSF Registration Notification flag are set in the EPS-UDR.

At step 1118, the HSS subscribes in UDM to be notified when the UE registers in the 5GC for SMS service (i.e. when an SMSF is registered in UDM) by using the Nudm_EE_Subscribe service operation (SUPI, SMSF Registration Notification event) as defined in 3GPP TS 23.502. In this case, the HSS subscribes to SMSF Registration Notification event in UDM instead to the UE Reachability Notification as even if the UE is reachable in an AMF, the UE will not be ready for SMS within the 5GC until an SMSF is registered for the UE in UDM.

At step 1120, the UDM stores the SMSF Registration Notification flag in the 5G-UDR.

At step 1122, the UDM acknowledges the subscription to the HSS.

Some messages as shown in FIG. 11 are similar as the corresponding messages as described in various 3GPP specifications such as 3GPP TS 23.501, V16.3.0, 3GPP TS 23.502, V16.3.0, 3GPP TS 23.632 V16.0.0, etc.

In an embodiment, as 5G is based on service-based architecture (SBA) and the interface used between Network Functions (NFs) are based on service-based interface (SBI), the interface may be modeled as Open API (Application Programming Interface) and defined in yaml files, the Nudm-UECM open API delta updates may be as following:

```
/{ueId}/registrations:
    get:
        summary: retrieve UE registration data
        operationId: GetRegistrations
        tags:
            - UECM Registration Info Retrieval
        parameters:
            - name: ueId
              in: path
              description: Identifier of the UE
              reguired: true
              schema:
                  $ref: 'TS29571_CommonData.yaml#/components/schemas/VarUeId'
            - name: supported-features
              in: query
              schema:
                  $ref: 'TS29571_CommonData.yaml#/components/schemas/SupportedFeatures'
            - name: registration-dataset-names
              in: query
              style: form
              explode: false
              description: List of UECM registration dataset names
              reguired: true
              schema:
                  $ref : '#/components/schemas/RegistrationDatasetNames'
            - name: single-nssai
              in: query
              content:
                  application/json:
                      schema:
                          $ref: 'TS29571_CommonData.yaml#/components/schemas/Snssai'
            - name: dnn
              in: query
              schema:
                  $ref: 'TS29571_CommonData.yaml#/components/schemas/Dnn'
        responses:
            '200':
                description: Expected response to a valid request
                content:
                    application/json:
                        schema :
                            $ ref: '#/components/schemas/RegistrationDataSets'
            '400':
                $ref: 'TS29571_CommonData.yaml#/components/responses/400'
            '403':
                $ref: 'TS29571_CommonData.yaml#/components/responses/403'
            '404':
                $ref: 'TS29571_CommonData.yaml#/components/responses/404'
            '500':
                $ref: 'TS29571_CommonData.yaml#/components/responses/500'
            '503':
                $ref: 'TS29571_CommonData.yaml#/components/responses/503'
            default:
                description: Unexpected error
```

In an embodiment, the Nudr-Dr open API delta updates especially on the data models may be following:

```
ContextDataSetName:
  anyOf:
  - type: string
    enum:
    - AMF_3GPP
    - AMF_NON_3GPP
    - SDM_SUBSCRIPTIONS
    - EE_SUBSCRIPTIONS
    - SMSF_3GPP
    - SMSF_NON_3GPP
    - SUBS_TO_NOTIFY
    - SMF_PDU_SESSIONS
    - type: string
ContextDataSets :
  type: object
  properties:
    amf3Gpp:
      $ref: '#/ components/schemas/Amf3GppAccessRegistration'
    amfNon3Gpp:
      $ref: '#/components/schemas/AmfNon3GppAccessRegistration'
    sdmSubscriptions:
      type: array
      items:
        $ref: '#/components/schemas/SdmSubscription'
      minItems: 1
    eeSubscriptions:
      type: array
      items:
        $ref: '#/components/schemas/EeSubscription'
      minItems: 1
    smsf3GppAccess:
      $ref: '#/components/schemas/SmsfRegistration'
    smsfNon3GppAccess:
      $ref: '#/components/schemas/SmsfRegistration'
    subscriptionDataSubscriptions:
      type: array
      items:
        $ref: '#/components/schemas/SubscriptionDataSubscriptions'
      minitems: 1
    smfRegistration:
      $ref: 'TS29503 Nudm UECM.yaml#/components/schemas/SmfRegistrationInfo'
```

Figure 12:
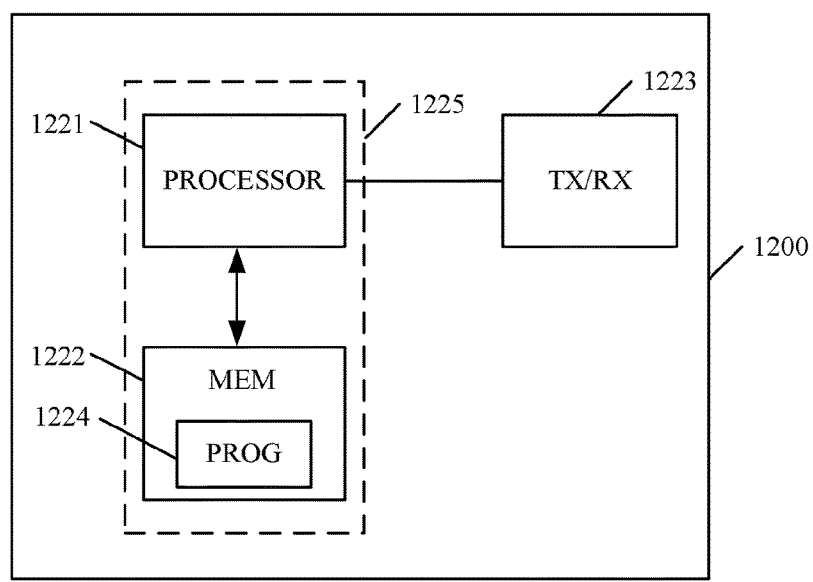
FIG. 12 is a block diagram showing an apparatus suitable for practicing some embodiments of the disclosure.

FIG. 12 is a block diagram showing an apparatus suitable for practicing some embodiments of the disclosure. For example, any one of the network function service consumer entity, the data management entity and the data repository entity described above may be implemented as or through the apparatus 1200.

The apparatus 1200 comprises at least one processor 1221, such as a DP, and at least one MEM 1222 coupled to the processor 1221. The apparatus 1220 may further comprise a transmitter TX and receiver RX 1223 coupled to the processor 1221. The MEM 1222 stores a PROG 1224. The PROG 1224 may include instructions that, when executed on the associated processor 1221, enable the apparatus 1220 to operate in accordance with the embodiments of the present disclosure. A combination of the at least one processor 1221 and the at least one MEM 1222 may form processing means 1225 adapted to implement various embodiments of the present disclosure.

Various embodiments of the present disclosure may be implemented by computer program executable by one or more of the processor 1221, software, firmware, hardware or in a combination thereof.

The MEM 1222 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1221 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the network function service consumer entity, the memory 1222 contains instructions executable by the processor 1221, whereby the network function service consumer entity operates according to the method as described in reference to FIG. 5.

In an embodiment where the apparatus is implemented as or at the data management entity, the memory 1222 contains instructions executable by the processor 1221, whereby the data management entity operates according to the method as described in reference to FIG. 6.

In an embodiment where the apparatus is implemented as or at the data repository entity, the memory 1222 contains instructions executable by the processor 1221, whereby the data repository entity operates according to the method as described in reference to FIG. 7.

Figure 13:
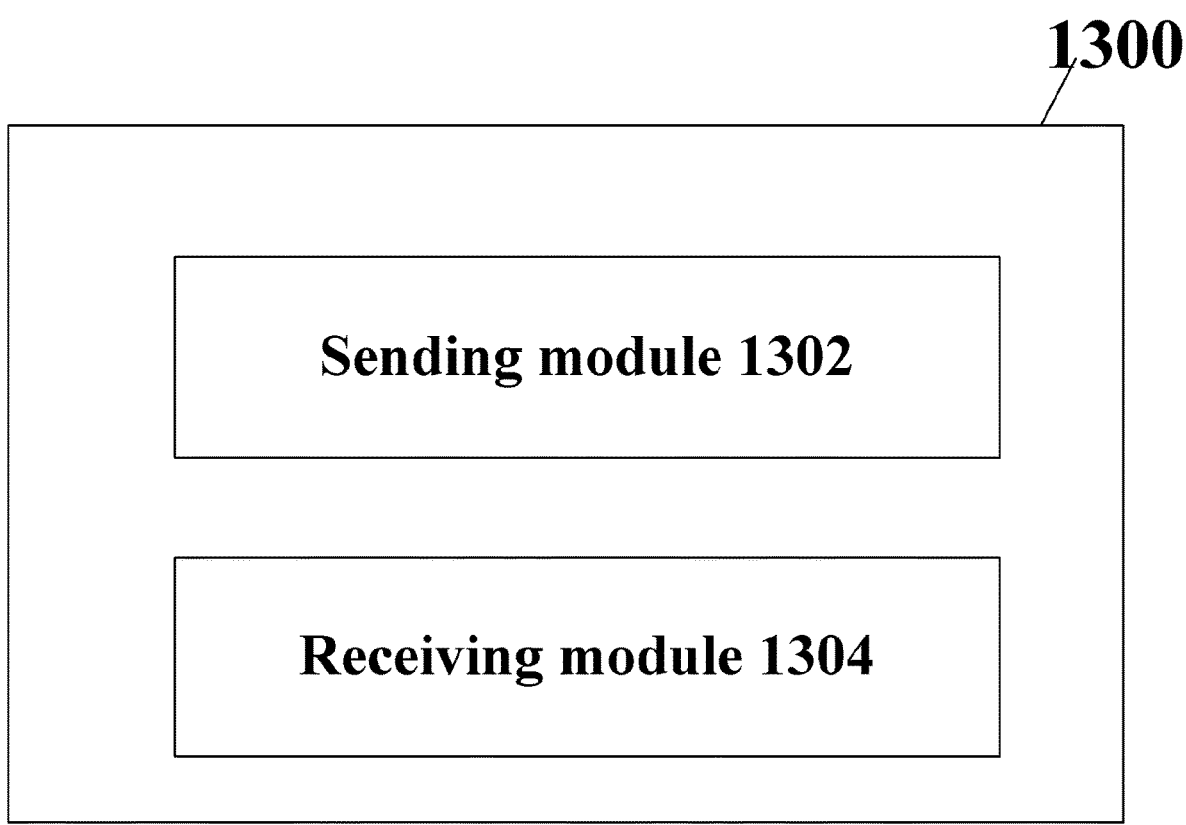
FIG. 13 is a block diagram showing a network function service consumer entity according to an embodiment of the disclosure.

FIG. 13 is a block diagram showing a network function service consumer entity according to an embodiment of the disclosure. As shown, the network function service consumer entity 1300 comprises a sending module 1302 and a receiving module 1304. The sending module 1302 may be configured to send a request for retrieving at least two registration data sets related to a user equipment to a data management entity. The request includes two or more corresponding registration data set names. The receiving module 1304 may be configured to receive a response from the data management entity. The response comprises at least two requested registration data sets related to the user equipment.

Figures 14, 15:
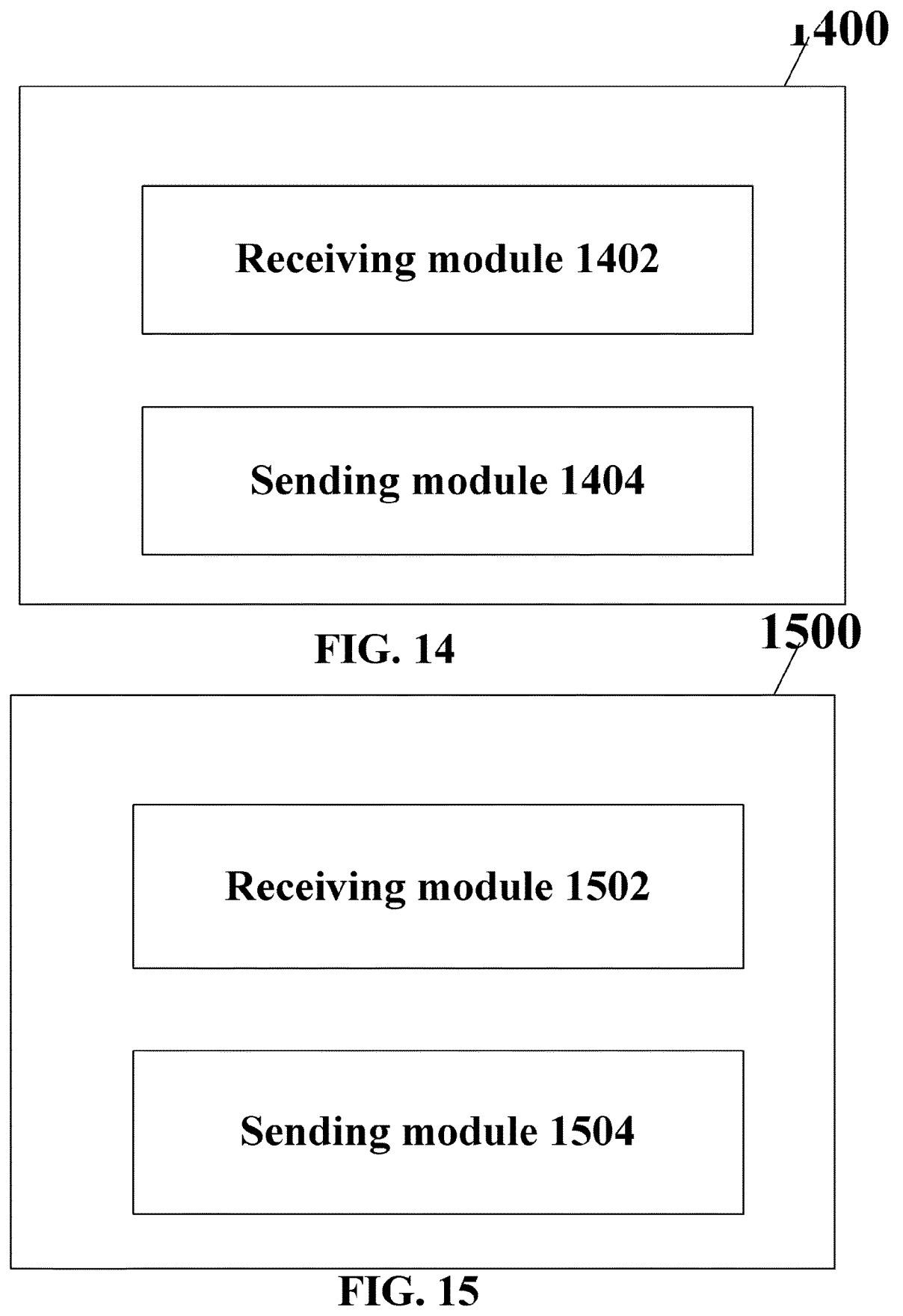

FIG. 14 is a block diagram showing a data management entity according to an embodiment of the disclosure. As shown, the data management entity 1400 comprises a receiving module 1402 and a sending module 1404. The receiving module 1402 may be configured to receive a request for retrieving at least two registration data sets related to a user equipment from a network function service consumer entity. The request includes two or more corresponding registration data set names. The sending module 1404 may be configured to send a response to the network function service consumer entity. The response comprises at least two requested registration data sets related to the user equipment.

FIG. 15 is a block diagram showing a data repository entity according to an embodiment of the disclosure. As shown, the data repository entity 1500 comprises a receiving module 1502 and a sending module 1504. The receiving module 1502 may be configured to receive a query quest for retrieving at least two registration data sets related to a user equipment from a data management entity, wherein the query request includes two or more corresponding registration data set names. The sending module 1504 may be configured to send a query response to the data management entity. The query response comprises at least two requested registration data sets related to the user equipment.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Embodiments herein afford many advantages, of which a non-exhaustive list of examples follows. In some embodiments herein, for data management entity such as UDM, a new GET method on resource {ueId}/registrations is introduced as generic registration data sets retrieval method to enable the possibility to retrieve multiple registration data sets with a single GET request. So use cases which have been identified that benefit from retrieving multiple registration data sets with a single GET request are supported by the proposed method provided by the data management entity. In some embodiments herein, for data repository entity such as UDR, the GET method for the multiple context data sets retrieval is updated to enable the possibility to retrieve multiple context data sets together with the sessions context data (such as SMF PDU sessions context data) with a single GET request. So use cases which have been identified that benefit from retrieving multiple registration data sets including the session context data with a single GET request are supported by the proposed method provided by the data repository entity. In some embodiments herein, unnecessary signaling traffic are avoided and the network efficiency are improved from operation point of view, which means OPEX (operating expenses) reduction. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a network function service consumer entity, wherein the network function service consumer entity is a network data analytics function (NWDAF) entity or a home subscriber server (HSS), comprising:

sending a single request for retrieving at least two registration data sets related to a user equipment to a data management entity, wherein the single request comprises two or more corresponding registration data set names and wherein the data management entity is a unified data management (UDM) entity, and wherein the single request further comprises single network slice selection assistance information (S-NSSAI) and a data network name (DNN) which are only applicable when a registration data set name identifies session management function (SMF) registration for protocol data unit (PDU) sessions; and receiving a single response from the data management entity, wherein the single response comprises at least two requested registration data sets related to the user equipment;

wherein the registration data set names include at least one of:

a registration data set name identifying session management function registration information;

a registration data set name identifying access and mobility management function (AMF) 3rd generation partnership project (3GPP) access registration information;

a registration data set name identifying AMF Non 3GPP access registration information;

a registration data set name identifying short message service function (SMSF) 3GPP access registration information; and a registration data set name identifying SMSF Non 3GPP access registration information.

2. The method according to claim 1, wherein the single request is a hypertext transfer protocol HTTP GET request and the single response is an HTTP GET response.

3. The method according to claim 2, wherein the HTTP GET response includes:

a response code 200 OK and a response body containing at least two requested registration data set related to the user equipment; or a response code 404 Not Found.

4. The method according to claim 1, wherein the single request further includes a user equipment identity representing the user equipment, in which the user equipment identity is a subscription permanent identifier (SUPI) or a generic public subscription identifier (GPSI).

5. A network function service consumer entity, wherein the network function service consumer entity is a network data analytics function (NWDAF) entity or a home subscriber server (HSS), comprising:

a processor; and a memory coupled to the processor, said memory containing instructions which, when executed by said processor, cause said network function service consumer entity to:

send a single request for retrieving at least two registration data sets related to a user equipment to a data management entity, wherein the single request comprises two or more corresponding registration data set names and wherein the data management entity is a unified data management (UDM) entity, and wherein the single request further comprises single network slice selection assistance information (S-NSSAI) and a data network name (DNN) which are only applicable when a registration data set name identifies session management function (SMF) registration for protocol data unit (PDU) sessions; and receive a single response from the data management entity, wherein the single response comprises at least two requested registration data sets related to the user equipment;

wherein the registration data set names include at least one of:

a registration data set name identifying session management function registration information;

a registration data set name identifying access and mobility management function (AMF) 3rd generation partnership project (3GPP) access registration information;

a registration data set name identifying AMF Non 3GPP access registration information;

a registration data set name identifying short message service function (SMSF) 3GPP access registration information; and a registration data set name identifying SMSF Non 3GPP access registration information.

* * * * *